US010606572B2

United States Patent
Naganuma et al.

(10) Patent No.: US 10,606,572 B2
(45) Date of Patent: Mar. 31, 2020

(54) APPARATUS AND METHOD FOR ASSISTING PREPARATION OF FLOW USING VISUAL PROGRAMMING TOOL

(71) Applicant: Hitachi, Ltd., Tokyo (JP)

(72) Inventors: Yuki Naganuma, Tokyo (JP); Hideki Nakamura, Tokyo (JP); Toshio Nishida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/291,237

(22) Filed: Mar. 4, 2019

(65) Prior Publication Data
US 2019/0332365 A1    Oct. 31, 2019

(30) Foreign Application Priority Data
Apr. 27, 2018   (JP) ................................. 2018-087569

(51) Int. Cl.
*G06F 8/41* (2018.01)
*G06F 8/34* (2018.01)

(52) U.S. Cl.
CPC ................ *G06F 8/433* (2013.01); *G06F 8/34* (2013.01)

(58) Field of Classification Search
CPC .................................. G06F 8/34; G06F 8/433
See application file for complete search history.

(56) References Cited

U.S. PATENT DOCUMENTS

| | | | | |
|---|---|---|---|---|
| 5,481,741 A * | 1/1996 | McKaskle | ............. | G06F 3/0481 345/522 |
| 7,506,304 B2 * | 3/2009 | Morrow | .................... | G06F 8/34 717/113 |
| 7,853,937 B2 * | 12/2010 | Janczewski | ............. | G06F 8/314 717/149 |
| 8,156,469 B2 * | 4/2012 | Seeger | ...................... | G06F 8/34 717/107 |
| 8,438,534 B2 * | 5/2013 | Thomson | ................ | G06F 16/88 717/105 |
| 8,561,048 B2 * | 10/2013 | Seeger | ...................... | G06F 8/34 717/109 |

(Continued)

FOREIGN PATENT DOCUMENTS

| | | | | |
|---|---|---|---|---|
| CN | 105320504 B | * | 8/2018 | ............... G06F 8/10 |
| CN | 108713205 A | * | 10/2018 | ......... G06F 16/2358 |

(Continued)

OTHER PUBLICATIONS

Shizuki et al., "Smart browsing among multiple aspects of data-flow visual program execution, using visual patterns and multi-focus fisheye views", May 2000, Academic Press (Year: 2000).*

(Continued)

*Primary Examiner* — Wei Y Zhen
*Assistant Examiner* — Junchun Wu
(74) *Attorney, Agent, or Firm* — Mattingly & Malur, PC

(57) ABSTRACT

A flow preparation assisting apparatus calculates a difference between one or more flow data sets and a template flow data set having been a base of the one or more flow data sets, and calculates a dependency relation between node attributes for a template flow indicated by the template flow data set, from the calculated difference. The flow preparation assisting apparatus issues a notification according to the calculated dependency relation.

10 Claims, 15 Drawing Sheets

(56) References Cited

U.S. PATENT DOCUMENTS

| | | | | |
|---|---|---|---|---|
| 10,360,000 | B2* | 7/2019 | Hanna | G06F 8/61 |
| 2004/0107414 | A1* | 6/2004 | Bronicki | G06F 8/34 |
| | | | | 717/105 |
| 2007/0169042 | A1* | 7/2007 | Janczewski | G06F 8/314 |
| | | | | 717/149 |
| 2008/0195626 | A1* | 8/2008 | Ukigawa | G06F 17/2247 |
| 2016/0283610 | A1* | 9/2016 | Simitsis | G06F 8/433 |
| 2017/0212732 | A1* | 7/2017 | Kaduwela | G06F 8/34 |
| 2018/0217818 | A1* | 8/2018 | Douglas | G06F 8/10 |

FOREIGN PATENT DOCUMENTS

| | | | | |
|---|---|---|---|---|
| JP | H07699832 | B2 * | 7/1995 | G06F 8/443 |
| JP | 2010-072880 | A | 4/2010 | |
| JP | 4515461 | B2 * | 7/2010 | G06F 17/24 |

OTHER PUBLICATIONS

Maas et al., "StatWire: Visual Flow-Based Programming for Statistical Analysis", 2017, RWTH Aachen University Computer Science Department (Year: 2017).*

Chan et al., "Visual programming support for graph-oriented parallel/distributed processing", Jul. 2005, Wiley & Sons, Ltd. (Year: 2005).*

Gautier et al., "XKaapi: A Runtime System for Data-Flow Task Programming on Heterogeneous Architectures", 2013, IEEE (Year: 2013).*

* cited by examiner

FIG. 3

```
                   ┌─ 500
[
  {
510 ─── "NodeId": "node1",
520 ─── "NodeType": "inject",
530 ─── "Category": "input",
540 ─── "NodeName": "Input Data",
550 ─── "Property": {
            "key1": "0",
            "key2": "0",
            "text": "test", ...
        },
560 ─── "x": 160,
        "y": 90,
570 ─── "wires": [
            [
                "28602f3c"
            ]
        ]
  },
  {
        "NodeId": "node2",
        "NodeType": "debug",
        "Category": "output",
        "NodeName": "Output Data",
        "Property": {
            "key3": "msg",
            "key4": "payload",
            "text": "test", ...
        },
        "x": 340,
        "y": 90,
        "wires": [
            [
                "451db713"
            ]
        ]
  },
  ...
]
```

FIG. 4

TEMPLATE MANAGEMENT INFORMATION
T100

| TemplateID | TemplateFlowData |
|---|---|
| template1 | template1-flow.json |
| template2 | template2-flow.json |
| ... | ... |

PROJECT MANAGEMENT INFORMATION
T200

| GroupName | ProjectName | TemplateID | ChangedFlowData |
|---|---|---|---|
| GRP1 | PJ1 | template1 | flow1-1.json |
|  | PJ2 | template2 | flow1-2.json |
| GRP2 | PJ3 | template2 | flow2-3.json |
| ... |  |  | ... |

CHANGE MANAGEMENT INFORMATION T300

| TemplateID | NodeID | NodeKey | TemplateVal | GroupName | ProjectName | PjVal | ChangedFlag |
|---|---|---|---|---|---|---|---|
| template1 | node1 | key1 | 0 | GRP1 | PJ1 | 1 | true |
| | | | | GRP3 | PJ4 | 0 | false |
| | | key2 | 0 | GRP1 | PJ1 | 0 | false |
| | | | | GRP3 | PJ4 | 1 | true |
| ... | ... | ... | ... | ... | ... | ... | ... |

FIG. 7

DEPENDENCY RELATION INFORMATION
T400

Template1

| ChangedNode | RelatedNode | node1 | | | | node2 | | | | ... |
| --- | --- | --- | --- | --- | --- | --- | --- | --- | --- | --- |
| | | key1 | key2 | ... | | key3 | key4 | ... | | |
| node1 | key1 | 0 | 0 | ... | | 0.8 | 0.1 | ... | | ... |
| | key2 | ... | ... | ... | | ... | ... | ... | | ... |
| | key3 | 0.8 | 0.3 | ... | 0.2 | 0.3 | 0.85 | ... | | ... |
| node2 | key4 | 0.1 | 0.85 | ... | 0.4 | 0.2 | 0.4 | ... | | ... |
| | ... | ... | ... | ... | | 0.05 | 0.05 | ... | | ... |
| ... | | ... | ... | ... | | ... | ... | ... | | ... |

FIG. 10

NODE MANAGEMENT INFORMATION
T500

| NodeType | Category | NodeKey | Tag |
|---|---|---|---|
| inject | input | text | tag1, tag4 |
| http | input | address | tag1, tag2 |
| mqtt | input | method | tag1, tag3 |
| ... | ... | address | tag1, tag2 |
| debug | output | text | tag4, tag6, tag7 |
| ... | ... | ... | ... |

RULE MANAGEMENT INFORMATION
T600

| RuleID | Rules | Selected Flag |
|---|---|---|
| Rule0 | (NodeID MATCHES) && (NodeKey MATCHES) | true |
| Rule1 | (NodeKey MATCHES) | false |
| Rule2 | (Category MATCHES) && (NodeKey MATCHES) | true |
| Rule3 | ALL tags MATCH | false |
| ... | ... | ... |

FIG. 12

FLOW CORRESPONDENCE INFORMATION
T700

| TemplateID | Template Flow | | | Group Name | Project Name | Changed Flow | | | Changed Flag |
| --- | --- | --- | --- | --- | --- | --- | --- | --- | --- |
| | NodeID | NodeKey | Val | | | NodeID | NodeKey | Val | |
| template1 | node1 | key1 | 0 | GRP1 | PJ1 | node4 | key41 | 1 | true |
| template1 | node1 | key2 | 0 | GRP1 | PJ1 | node4 | key42 | 0 | false |
| template1 | node2 | key3 | 'a' | GRP1 | PJ1 | node5 | key6 | 'b' | true |
| ... | ... | ... | ... | ... | ... | ... | ... | ... | ... |
| template1 | node10 | key10 | 'c' | GRP1 | PJ1 | node10 | key10 | 'c' | false |
| ... | ... | ... | ... | ... | ... | ... | ... | ... | ... |
| templaten | noden | keyn | 100 | GRPn | PJn | -(None) | -(None) | -(None) | true |
| ... | ... | ... | ... | ... | ... | ... | ... | ... | ... |

T710 Template Flow; T711 TemplateID; T712 NodeID; T713 NodeKey; T714 Val; T720 Changed Flow; T721 Group Name; T722 Project Name; T723 NodeID; T724 NodeKey; T725 Val; T730 Changed Flag

FIG. 16
PROJECT MANAGEMENT INFORMATION T200

| GroupName | ProjectName | TemplateID | ChangedFlowData |
|---|---|---|---|
| GRP1 | PJ1 | template1 | flow111.json |
|  |  | template3 | flow113.json |
|  | PJ2 | template2 | flow122.json |
| GRP2 | PJ3 | template2 | flow232.json |
|  |  | template4 | flow234.json |
| ... | ... | ... | ... |

T210, T220, T230, T240

FIG. 17
CHANGE MANAGEMENT INFORMATION T300

| | CHANGE ORDER |
|---|---|
| T310-T370 | 1 |
| ... | ... |

APPARATUS AND METHOD FOR ASSISTING PREPARATION OF FLOW USING VISUAL PROGRAMMING TOOL

BACKGROUND OF THE INVENTION

1. Field of the Invention

The present invention relates generally to information and communication technology and software development technology, and particularly to a technique for assisting preparation of a flow using a visual programming tool.

2. Description of the Related Art

As a programming tool, there is a visual programming tool that can develop application software (hereinafter referred to as an application) that operates by describing a model diagram without writing source code. One example is Node-RED (https://nodered.org/) as open source software (OSS). In software development using visual programming tools, an attribute value as a value corresponding to usage, an environment, and other circumstances is set as required for a node in which various processes are represented, and a flow formed by a connection indicating a relationship between nodes (e.g., a flow of processing) is prepared. An example of the attribute value includes an acquisition destination of information, and an example of the relationship between nodes is a flow of data. By using such a visual programming tool, a developer can develop an application that intuitively performs intended processing even without sufficient knowledge of software development. Meanwhile, the visual programming tool may be called "model development environment". A constituent element and a processing unit of software are nodes, and a connection between nodes may be called "edge". "Node" and "edge" are terms in a directed graph, and a flow diagram in Node-RED can also be regarded as a directed graph. In this specification, a flow diagram, a block diagram, and a directed graph are synonymous, a flow diagram can be simply called "flow", and "flow" and "graph" can be synonymous.

Further, in a field of software development, an application model prepared in advance (hereinafter called a template, and may also be called a catalog) is often used to shorten a development period. Here, "template" can indicate one in which a relationship between elements constituting an application and setting information are described in terms of software. A developer of the application can shorten the development period and efficiently develop the application by acquiring a template close to a purpose from a template list (also called a marketplace or the like) and simply changing a necessary part.

By applying a similar idea to the visual programming tool, application developers can expect to efficiently develop applications by acquiring flow templates and making changes.

JP 2010-072880 A discloses a technique for eliminating a problem of setting by preliminarily defining constraint conditions of setting information used for internal processing of each object, when objects (nodes) perform processing in cooperation with each other.

SUMMARY OF THE INVENTION

By using templates, developers are not required to arrange nodes and connections between nodes from scratch in application development using visual programming tools, and can expect to develop applications efficiently. However, developers do not always fully understand the contents of templates, and often require time to understand templates. Particularly in the development with the visual programming tools, since it is an advantage that the development can be intuitively achieved even without sufficient knowledge of software development as described above, this problem will impair the advantage. This disables achievement of both effects of using the visual programming tools and templates. For example, there are cases in which, in changing an attribute value associated with a certain node, an attribute value of another cooperating node is required to be changed. However, it is difficult to notice this without understanding the template, which inhibits efficient development.

It is conceivable to make change in another node when changing a certain node by using the technique of JP 2010-072880 A and preliminarily defining a constraint condition in accordance with a template.

However, with the technique disclosed in JP 2010-072880 A, it is necessary to preliminarily define this constraint condition. Therefore, in a case where another developer is also using the template, it is not possible to reflect knowledge of such another developer. In addition, it requires time and effort to preliminarily define constraint conditions for individual templates.

A flow preparation assisting apparatus calculates a difference between one or more flow data sets and a template flow data set having been a base of the one or more flow data sets, and calculates a dependency relation between attribute values for a template flow indicated by the template flow data set from the calculated difference. The flow preparation assisting apparatus issues a notification of information on the calculated dependency relation.

According to the present invention, it is possible to calculate a dependency relation between attribute values for a template flow data set without requiring preliminarily defining a constraint condition for each template flow data set, and to issue a notification of information on the dependency relation. In addition, when there are multiple developers who develop applications with visual programming tools, a developer of a certain application can utilize knowledge of another developer.

BRIEF DESCRIPTION OF THE DRAWINGS

FIG. 3 shows an example of a flow data set;

FIG. 4 shows an example of template management information;

FIG. 5 shows an example of project management information;

FIG. 6 shows an example of change management information;

FIG. 7 shows an example of dependency relation information;

FIG. 10 shows an example of node management information in a second embodiment;

FIG. 11 shows an example of rule management information in the second embodiment;

FIG. 12 shows an example of flow correspondence information in the second embodiment;

FIG. 16 shows an example of project management information in a third embodiment; and FIG. 17 shows an example of a part of change management information in a fourth embodiment.

DESCRIPTION OF THE PREFERRED EMBODIMENTS

Figure 1:
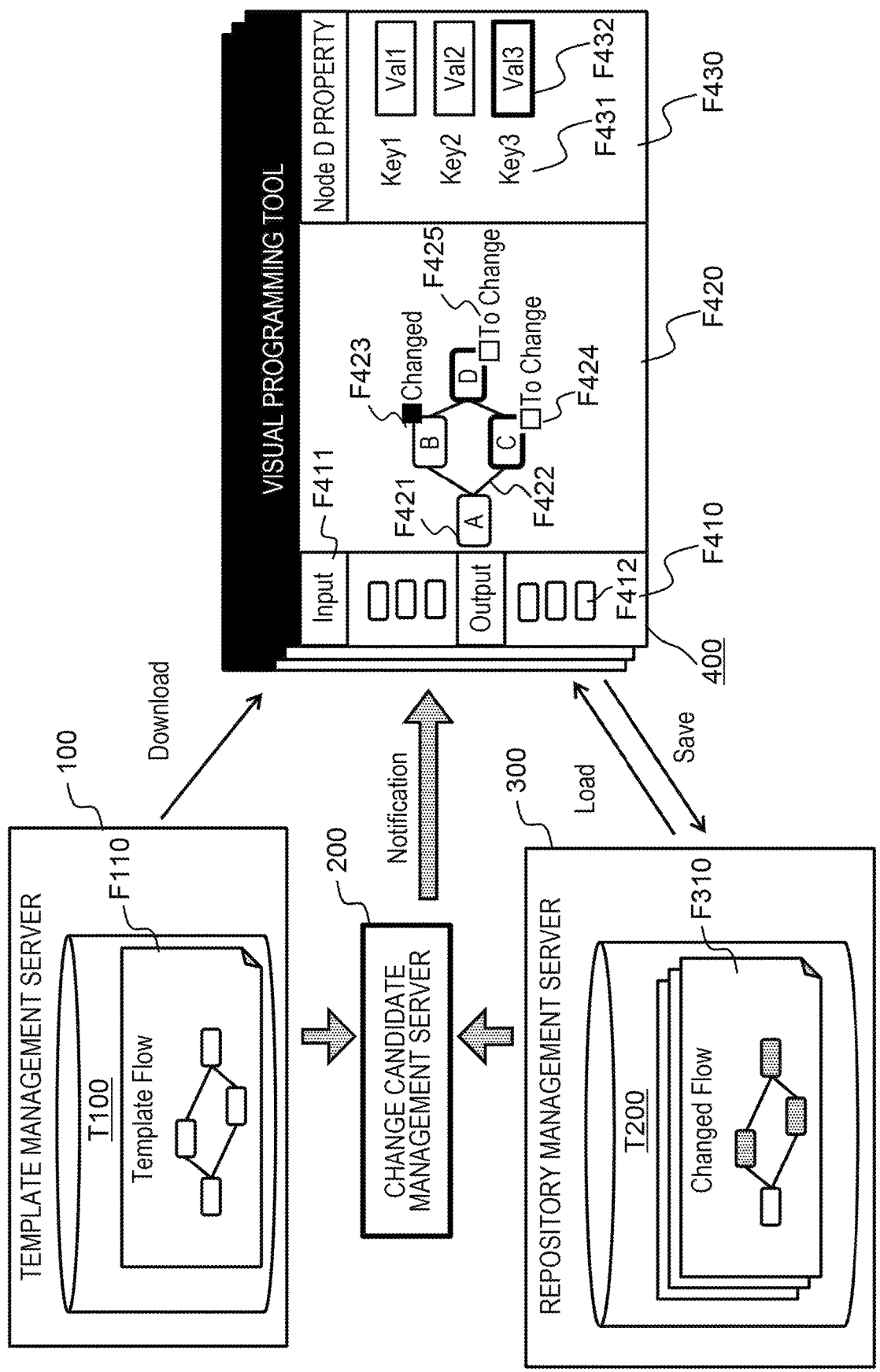
FIG. 1 is a schematic diagram showing an outline of a first embodiment of the present invention.

Hereinafter, examples related to implementation of the present invention will be described. All the following are examples for explaining the features of the present invention and do not limit the embodiments of the present invention.

In the following description, "interface unit" may be one or more interfaces. The one or more interfaces may include at least a communication interface unit, out of a user interface unit and a communication interface unit. The user interface unit may be at least one I/O device out of one or more I/O devices (e.g., an input device (e.g., a keyboard and a pointing device) and an output device (e.g. a display device)) and a display computer, and may alternatively or additionally be an interface device for the at least one I/O device. The communication interface unit may be one or more communication interface devices. The one or more communication interface devices may be one or more of communication interface devices of a same type (e.g., one or more network interface cards (NIC)) or two or more of communication interface devices of different types (e.g., an NIC and a host bus adapter (HBA)).

Further, in the following description, "memory unit" is one or more memories, and may typically be a main storage device. At least one memory in the memory unit may be a volatile memory or a non-volatile memory.

Further, in the following description, "PDEV unit" is one or more PDEVs, and may typically be an auxiliary storage device. "PDEV" means a physical storage device (Physical storage DEVice), and typically is a non-volatile storage device, for example, a hard disk drive (HDD) or a solid state drive (SSD).

Further, in the following description, "storage unit" is at least one of the memory unit or the PDEV unit (typically, at least the memory unit).

Further, in the following description, "processor unit" is one or more processors. The at least one processor is typically a microprocessor such as a central processing unit (CPU), but may be another kind of processor such as a graphics processing unit (GPU). The at least one processor may be single core or multi core. The at least one processor may be a processor in a broad sense, such as a hardware circuit (e.g., a field programmable gate array (FPGA) or an application specific integrated circuit (ASIC)) that performs a part or all of processing.

In addition, in the following description, while processing may be described with "program" as the subject, the subject of the processing may be a processor unit (or a device having a processor unit) since the program executes predetermined processing by being executed by the processor unit while appropriately using the storage unit and/or the interface unit. The program may be installed from a program source into a device such as a computer. The program source may be, for example, a program distribution server or a (e.g., non-transitory) recording medium readable by a computer. Further, in the following description, two or more programs may be realized as one program, or one program may be realized as two or more programs.

Further, in the following description, while there is information such as template management information, change management information, dependency relation information, project management information, node management information, rule management information, and flow correspondence information, such information is information that can provide an output for an input. Such information may be information of any structure or a learning model such as a neural network that generates an output for an input.

Further, in the following description, "data set" is one chunk of logical electronic data viewed from a program such as an application program, and may be any of a record, a file, a key value pair, and a tuple, for example.

First Embodiment

FIG. 1 is a schematic diagram showing an outline of a first embodiment of the present invention. The outline of the first embodiment of the present invention will be described with reference to FIG. 1.

There is a template management server 100 that manages template management information T100 including information on a template flow data set F110 indicating a template flow. Further, there is a visual programming tool 400 that displays a template flow indicated by the template flow data set F110 (a copy of the template flow data set F110) downloaded from the template management server 100. Further, there is a repository management server 300 that manages project management information T200 including information on a flow data set F310 indicating a flow prepared (developed) by the visual programming tool 400, and enables loading into the visual programming tool 400 and saving from the visual programming tool 400. Further, there is a change candidate management server 200 (an example of a flow preparation assisting apparatus) that analyzes a flow change on the basis of information of the template management server 100 and the repository management server 300, and assists flow preparation by the visual programming tool 400.

The repository management server 300 may be a server for management of source code used in general application development (in this case, flow data of an application developed by the visual programming tool), and, as an example, may be GitHub (https://github.com/) (registered trademark) or GitLab (https://about.gitlab.com/) (registered trademark).

The visual programming tool 400 may be executed on a client terminal or may be executed on a server capable of communicating with a client terminal. A screen provided by the visual programming tool 400 has three panes such as, for example, a first pane F410 to display a list of available nodes, a second pane F420 to edit a flow including arranged nodes, and a third pane F430 to change an attribute value of a node selected from the flow.

In the first pane F410, each node F412 is classified into a characteristic (Category) F411 corresponding to the node F412. The developer arranges the node F412 in the first pane F410 by dragging and dropping and the like as a node F421 in the second pane F420, and define a relation (processing flow) by connecting between the nodes F421 with a connection F422. For example, in a case where the right side of the node represents an input of data and the left side of the node represents an output, connecting the right side of a certain node A to the left side of another node B can represent that an output obtained from the node A is inputted to the node B. Meanwhile, the second pane F420 may display a template flow indicated by the downloaded template flow data set F110.

Further, when the developer selects a specific node F421 from the first pane F410 or the second pane F420, the third pane F430 displays a list of node attributes (in this case, a set of a label (Key) F431 and an attribute value F432) constituting a property of the selected node F421. The developer can change a desired attribute value in the attribute value list displayed in the third pane F430.

Then, the visual programming tool 400 enables execution of an application that executes a process of the node included in the flow thus represented in the visual programming tool, or deploys in an external processing server and executes a process represented by the flow. Alternatively, the visual programming tool 400 may generate a binary object executable on a computer on the basis of the flow. In order to provide such a function, the visual programming tool 400 may have an execution button for execution of these processes, a deploy button, or a binary creation button.

In such a configuration, the application developer can acquire the template flow data set F110 defined in the template management server 100, edit the template flow indicated by the template flow data set F110 by using the visual programming tool 400, and prepare (develop) an intended application flow. For this purpose, the developer changes an attribute value of the node B, for example. In this case, the fact that the attribute value of the node B has been changed is displayed as a status "Changed" of the node B, as indicated by reference numeral F423, for example.

Here, since the developer does not understand the template flow (or shallowly understands the template flow), the developer does not know the necessity of changing an attribute value of another node dependent on the change of the attribute value of the node B (e.g., the necessity of changing an attribute value of a node C and a node D). For example, in a case where an attribute value of the node B and an attribute value of the node C belong to a same kind of node attribute (e.g., in a case where at least one of NodeType or Category is the same), changing the attribute value of the node B correspondingly requires changing of the attribute value of the node C. However, there may be a situation in which the developer is not able to notice this. It is considered that a dependency relation can be preliminarily defined for attribute values whose dependency relations are clear in advance. However, preliminarily defining dependency relations takes time and effort, and dependency relations between all attribute values are not always clear. For example, in a case where the node D is a node for visualization (graph display) and displays results of the node B and the node C, when a reference destination of the attribute of the node B or the node C is changed, this result may indirectly affect the node D. Specifically, as the attribute value of the node B and the attribute value of the node C are increased due to the change, a range of the attribute value of the node D for visualization (e.g., a vertical axis of a bar graph) may be changed accordingly. The change candidate management server 200 according to the first embodiment can also calculate such an indirect dependency relation between attribute values, and issue, to the developer, a dependency relation notification that is a notification of information on the dependency relation. Examples of the dependency relation notification include change presentation F424 of an attribute value (attribute value of the node C) being in a direct dependency relation with the changed attribute value of the node B, or change presentation F425 of an attribute value (attribute value of the node D) being in an indirect dependency relation with the changed attribute value of the node B. Further, examples of the dependency relation notification also include emphasis display of an attribute value (Val3) F432 having a dependency relation with the changed attribute value of the node B among two or more attribute values of the node D, when the node D (an example of the node subjected to change presentation) is selected. In this way, in the present embodiment, an attribute value being in a dependency relation with a changed attribute value of a certain node can be presented as an attribute value that is desired to be changed in relation to the change of the attribute value of the certain node, without preliminarily defining dependency relations between attribute values. Note that "being in a dependency relation" can also be read as "strength of a dependency relation is equal to or greater than a certain value".

Figure 2:
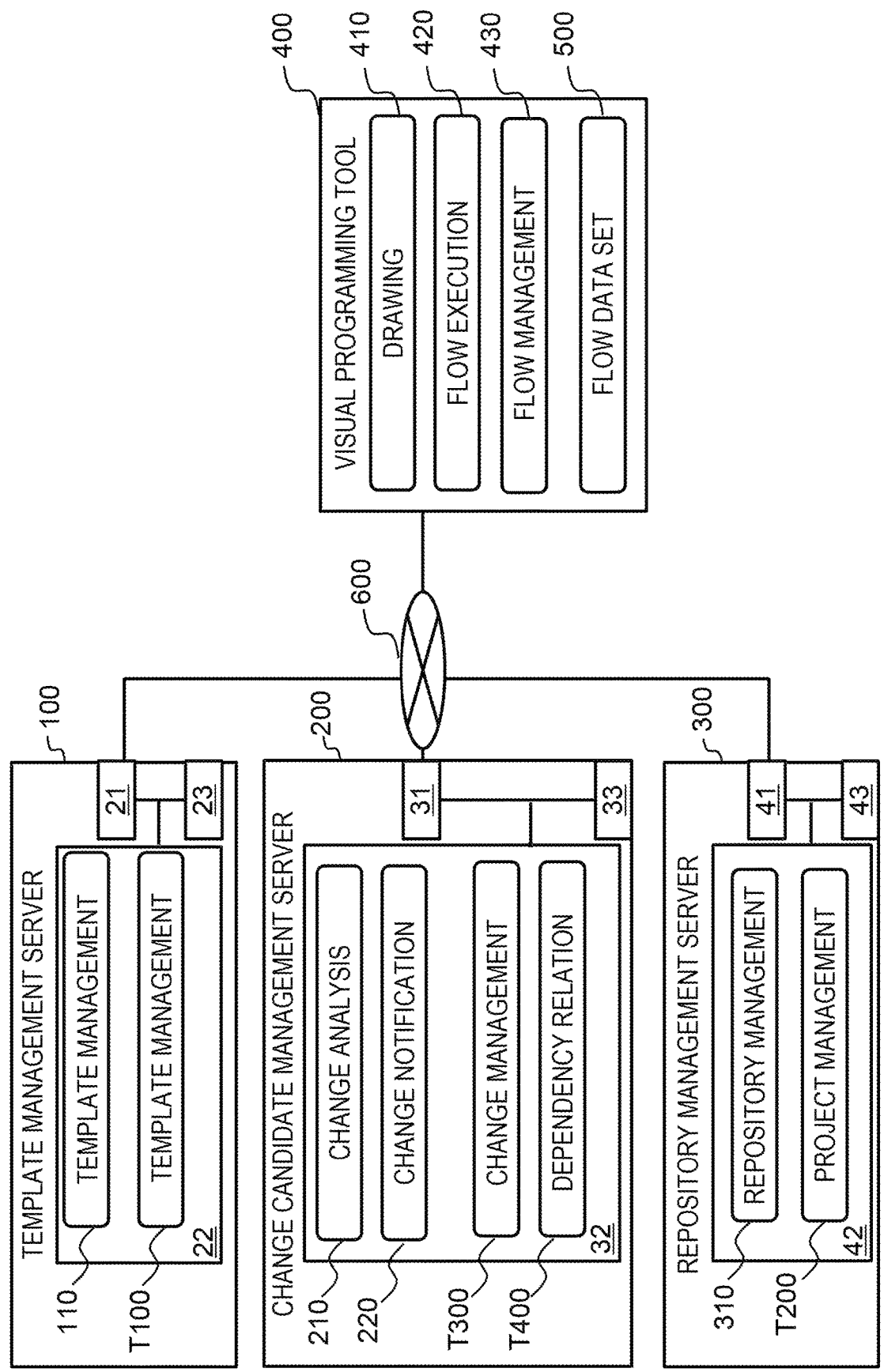
FIG. 2 is a configuration diagram of a system according to the first embodiment.

FIG. 2 is a configuration diagram of a system according to the first embodiment.

The template management server 100, the change candidate management server 200, the repository management server 300, and one or a plurality of visual programming tools 400 communicate via a network 600. These servers and tools each operate on a computer including a CPU, a memory, a hard disk, and the like. The operation form may be an operation on computers that each are physically different, or may be an operation on a virtual server which is units of computers obtained by logically dividing a physical computer. Alternatively, the operation may be in units of a task (also called a process or a container) executed on one computer or a plurality of computer clusters. In the present embodiment, it is assumed that each of the servers 100, 200, and 300 is a computer system formed by one or more physical computers. Note that all of the servers 100, 200, and 300 may be a software-defined server realized by installing and executing predetermined software.

The template management server 100 has an interface unit 21, a storage unit 22, and a processor unit 23 connected to the interface unit 21 and the storage unit 22. The interface unit 21 enables communication via the network 600. The storage unit 22 stores a template management program 110 and the template management information T100. The template management program 110 is executed by the processor unit 23. The template management program 110 performs registration, reference (provision of a template flow data set to outside), search, and the like of the template flow data set. Further, the template management program 110 may provide a graphical user interface (GUI) or the like for reference to the template flow data set. The template management information T100 is information for managing the template flow data set, while details will be described with reference to FIG. 4.

The visual programming tool 400 includes a drawing program 410 for displaying a GUI for flow editing (e.g., a GUI including the panes F410, F420, and F430 described above) and a flow data set 500 including information on a flow configuration, and additionally includes a flow execution program 420, a flow management program 430, and the like. These programs are executed by the processor unit. The flow execution program 420 executes a process described in the flow data set. For example, the execution method may be such that the program 420 itself performs a process corresponding to individual nodes within the same tool and relays information between the nodes, or the execution method may be realized by constructing a process of each node outside the tool and calling the process. Alternatively, the execution method may be such that a binary executable on the computer is generated instead of the program 420. An example of the flow data set 500 will be described with reference to FIG. 3. The flow management program 430 is a program for performing flow management of the visual programming tool 400, and is a program to provide an interface for sending and receiving template flow data from the template management server 100, and an interface for sending and receiving flow data to and from the repository management server 300.

In addition, the visual programming tool 400 or any one of the individual programs constituting the visual programming tool 400 may have buttons for acquiring flow data from the repository management server 300 and for storing flow data in the server 300.

Further, the visual programming tool 400 may be used by multiple developers in parallel. The use form may be a form in which each tool is provided for each developer, or a form in which a drawing program, a flow data set, a flow execution program, and the like for each developer may be executed in one tool.

The repository management server 300 has an interface unit 41, a storage unit 42, and a processor unit 43 connected to the interface unit 41 and the storage unit 42. The interface unit 41 enables communication via the network 600. The storage unit 42 stores the project management information T200 including information on a flow data set prepared by the developer, and a repository management program 310 for managing the project management information T200. The repository management program 310 is executed by the processor unit 43. The repository management program 310 has functions provided by the general repository management software described above, and includes a function for performing, for example, management (such as registration, change, and deletion) of source code (flow data set) of the developed application, management of developers using the same repository, or external notification at a time of changing the project management information T200. Details of the project management information T200 will be described with reference to FIG. 5.

The change candidate management server 200 has an interface unit 31, a storage unit 32, and a processor unit 33 connected the interface unit 31 and the storage unit 32. The interface unit 31 enables communication via the network 600. The storage unit 32 stores: a change analysis program 210 for analyzing a dependency relation of nodes and attribute values of the nodes on the basis of information collected from the template management server 100 and the repository management server 300; a change notification program 220 for notifying a change candidate to the visual programming tool on the basis of the result; and change management information T300 and dependency relation information T400 as information for these. The change analysis program 210 and the change notification program 220 are executed by the processor unit 33. Calculating a dependency relation and issuing a notification according to the calculated dependency relation by the repository management server 300 may be realized by execution of programs such as the change analysis program 210 and the change notification program 220 by the processor unit 33. Details of processing and information of each program will be described later.

Note that each of the programs and the information does not limit a server for operation, but may be operated by another server. For example, the change notification program 220 included in the change candidate management server 200 may be included in the visual programming tool 400.

FIG. 3 shows an example of the flow data set 500.

An example of representation of a flow data set is a data format called JSON. In addition to this, other data structures such as XML and YAML may be adopted.

For each node, the flow data set 500 includes; NodeID 510 for uniquely identifying a node on a flow; NodeType 520 that is a type of the node (e.g., corresponding to a class in object orientation); Category 530 indicating classification of the node; NodeName 540 that is a display name of the node; Property 550 that is one or more node attributes of the node; coordinates 560 that is display position information in a flow editing pane (second pane) F420; wires 570 indicating a connection relation between nodes; and the like.

Meanwhile, the coordinates 560 may be three or more dimensions. That is, the coordinates 560 may include a height or Index information of a tab when UI is divided by tabs. Further, for convenience, a form is such that a node attribute (e.g., a set of a key (key1 or key2 in the figure) and an attribute value (0 corresponding to key1 in the figure)) is held in a structure called Property 550, but category "Property" does not necessarily exist. That is, there may be description of each node attribute at a position parallel to the NodeID 510 or the like. In addition, the flow data set 500 may include an identifier or the like of a template flow data set having been a base of the flow data set.

FIG. 4 shows an example of the template management information T100.

The template management information T100 has an entry for each template flow data set. Each entry stores information such as TemplateID T110 indicating a unique identifier of a template flow data set, and TemplateFlowData T120 indicating a flow data set generated on the basis of the template flow data set. The TemplateFlowData T120 may directly store JSON data as shown in the corresponding flow data set 500 (see FIG. 3), or may be such as a pointer indicating a storage location of the flow data set 500. Hereinafter, for convenience, it is regarded that the flow data set itself is represented by a value of TemplateFlowData T120.

FIG. 5 shows an example of the project management information T200.

The project management information T200 has an entry for each flow data set. Each entry stores information such as GroupName T210, ProjectName T220, TemplateID T230, and ChangedFlowData (e.g. source code) T240. Here, a flow data set alone is included as source code for convenience, but other information may be included. Further, the TemplateID T230 is included for convenience, but may be included in the ChangedFlowData T240 as an aspect other than this. Alternatively, a relationship between a group or a project and the template flow data set may be specified from logs of the template management server 100 and the repository management server 300.

A group represented by the GroupName T210 and a project represented by the ProjectName T220 can be regarded as, as one aspect, an organization (group) formed by a certain group of developers and source code of a certain application (project) developed by the organization. In the following description, "xx" is xx as a value, and xx written without the symbol " " is an element identified from the value xx. For example, "GRP1" is GRP1 as a value, and GPR1 written without the symbol " " means a group called GRP1. In the example of FIG. 5, there are groups of GRP1 and GRP2, while GRP1 develops PJ1 that manages an application by a flow data set (flow 1-1.json) obtained by editing template1, and develops PJ2 that is an application obtained by editing template2. Meanwhile, a relationship between the group and the project is 1:n in general, but in a case of 1:1, these two may be the same.

In addition, the project management information T200 may have, for each group or project, a snapshot of source code called a branch that is used for development represented by GitHub flow or Git flow (Git is a registered trademark). The branch includes the latest executable source code called a master branch and source code branched from the current or past master. As an example, the master branch is source code of the latest application, and bug fixes of the next version source code and the latest application are handled as different branches. In a case where such a plurality of branches are included, hereinafter, the master branch will be used unless otherwise specified. This is because the master branch generally stores the latest source code being released. Instead of this, rules may be provided such as using a branch with the latest update date as the branch of the target source code.

Further, in general, it is common that access authority is managed in group units or project units, and developers who belong to GRP1 but not belong to GRP2 are not able to refer to information of GRP2. In the present embodiment, knowledge of multiple developers can be reflected on the dependency relation information T400 (see FIG. 7) without directly referring to flow data of other groups and projects.

FIG. 6 shows an example of the change management information T300.

The change management information T300 is to indicate whether or not an attribute value of a node included in a template flow has been changed in each group or project.

The change management information T300 has an entry for each node attribute. While taking one node attribute as an example ("target node attribute" in the description of FIG. 6), information stored in an entry corresponding to the node attribute will be described.

The entry stores: TemplateID T310 indicating an identifier of a data set of a template flow including the target node attribute; NodeID T320 indicating an identifier of a node (a node included in the template flow) associated with the target node attribute; NodeKey T330 indicating a key (an identifier of an attribute value) included in the target node attribute; TemplateVal T340 indicating an attribute value included in the target node attribute; GroupName T350 and ProjectName T360 that are names of a group and a project developing a flow (application) including the target node attribute or a node attribute after editing the target node attribute; PjVal T370 indicating an attribute value (a value corresponding to an attribute value in the target node attribute) in the flow; and ChangedFlag T380 indicating whether or not an attribute value in the target node attribute has been changed ("true" means changed) from an attribute value in the flow (a value corresponding to an attribute value in the target node attribute). A specific generation process and a usage method will be described later.

FIG. 7 shows an example of the dependency relation information T400.

The dependency relation information T400 is information for managing a dependency relation between nodes and between node attributes of the nodes included in a template flow. The dependency relation information T400 exists for each template flow data set. In the description of FIG. 7, one template flow data set is taken as an example.

For each node attribute of a node in a template flow, the dependency relation information T400 includes a dependency relation value, which is a numerical value indicating strength of a dependency relation between a node attribute (ChangedNode) and each node attribute (RelatedNode) other than the node attribute. Between certain node attributes, the dependency relation value indicates a degree of being changed (possibility of being changed), at a time of changing an attribute value of one node attribute (ChangedNode), of an attribute value of another node attribute (RelatedNode). An example of the degree is a conditional probability. In the example shown in the figure, when an attribute value corresponding to key1 of node1 is changed, the conditional probability that an attribute value corresponding to key3 of node2 is accordingly changed is 0.8 (80%). The conditional probability is handled in the present embodiment, but in addition to this, for example, the dependency relation value may also be a value obtained from a function (f (NodeID, NodeKey)), which is preliminary defined by a node and an attribute derived from the template management information T100 and the project management information T200.

A specific calculation method and a usage method of the dependency relation information T400 will be described later.

Figure 8:
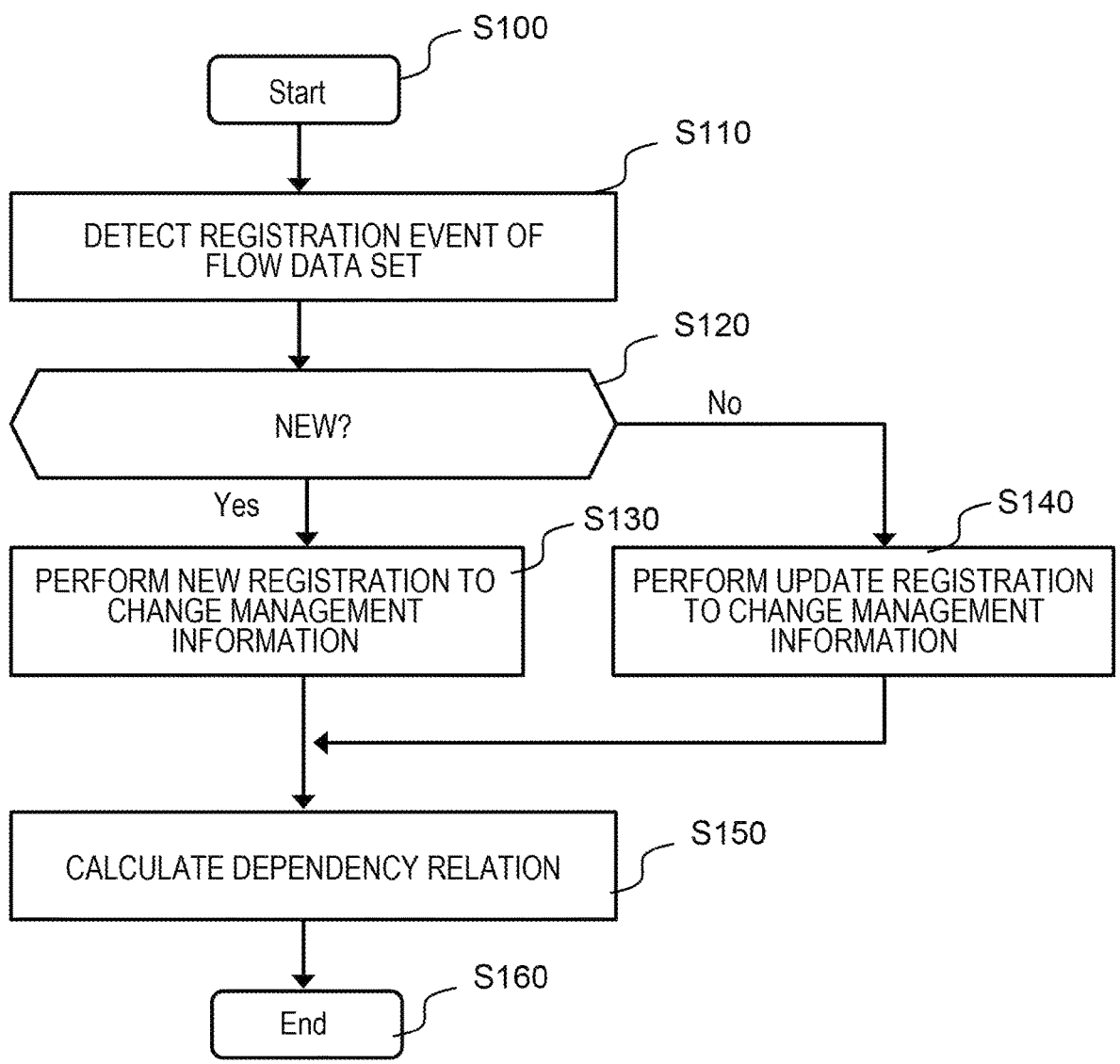
FIG. 8 shows a process to be performed by a change analysis program in the first embodiment.

FIG. 8 shows a process to be performed by the change analysis program 210.

The change analysis program 210 is a program for generating the change management information T300 and the dependency relation information T400 from the template management information T100 and the project management information T200 that is information on various applications developed by developers by using each template, and for calculating a dependency relation between attribute values (that is, susceptibility of an attribute value of another node to be changed when an attribute value of a certain node is changed).

Further, in the first embodiment, in a case of preparing a flow on the basis of a copy of a template flow (e.g., a template flow indicated by a downloaded template flow data set), it is assumed that NodeID of a node included in an original template flow is not different from NodeID of a node included in a template flow (an example of a copy of the template flow) downloaded by the group or the project. That is, it is assumed that nodes at a same position have same NodeID, between the original template flow and the downloaded template flow (template flow in the group or the project). In a case of applying to a system in which NodeID is changed when a flow of a group and a project is generated on the basis of a template flow, the application is enabled by taking an action such as separately having a correspondence between the NodeID of the node included in the template flow and the NodeID of the node included in the flow of the group and the project.

The change analysis program 210 starts a process (S100), monitors registration of a flow data set to the repository management server 300, and detects a registration event of the flow data set to the repository management server 300 (change event of the flow data set) by the developer (S110).

The start of this processing (S100) may be in a form of starting up at the start of the present system, or may be in an aspect of being activated in response to the registration event of the flow data set to the repository management server 300. Further, detection of the registration event of the flow data set may be in an aspect in which the change analysis program 210 monitors and detects a change in the project management information T200 of the repository management server 300. Alternatively, an aspect may be adopted in which the repository management server 300 makes settings in advance to notify the change analysis program 210 when a change has occurred in the repository management server 300, and the repository management server 300 notifies the change (a mechanism called WebHook, as one example).

Next, the change analysis program 210 refers to the change management information T300 and determines whether the change of the project management information T200 is registration of a new project or a change of an existing project (S120). Specifically, in GroupName T350 and ProjectName T360 of the change management information T300, when there is no GroupName T210 and no ProjectName T220 corresponding to the flow data set in which the change has occurred this time in the project management information T200 (corresponding to the current registration event) (S120: Yes), the process proceeds to S130 (new registration), or otherwise (S120: No) the process proceeds to S140 (update registration).

In a case of new registration, the change analysis program 210 registers the flow data set of the newly registered group and project in the change management information T300 (S130). Specifically, the change analysis program 210 refers to the TemplateID T230 associated with the GroupName T210 and the ProjectName T220 corresponding to the current registration event, and specifies the template flow data set having been a base (the template flow data set corresponding to the referred TemplateID T230). Then, the change analysis program 210 adds data to the change management information T300 (hereinafter, a set of NodeID and NodeKey will be described as "NodeID/NodeKey") for each NodeID and NodeKey of a node included in the flow data set indicated by ChangedFlowData T240 corresponding to the TemplateID T230. That is, for each NodeID/NodeKey included in the flow data set indicated by the ChangedFlowData T240 of the target group and project (hereinafter described as "group/project"), the GroupName T350 (a value matching the GroupName T210), the ProjectName T360 (a value matching the ProjectName T220), and the PjVal T370 (a value specified on the basis of the corresponding NodeID T320 and NodeKey T330 included in the ChangedFlowData T240) are registered in a portion where the corresponding TemplateID T310, NodeID T320, and NodeKey T330 of the change management information T300 match. Thereafter, the change analysis program 210 sets the ChangedFlag T380 to "true" when there is a change between TemplateVal T340 and PjVal T370, or otherwise sets to "false".

In a case of update registration of an existing data set, the change analysis program 210 performs S140. That is, for each NodeID/NodeKey included in the flow data set in which a change has occurred (flow data set indicated by the ChangedFlowData T240), the change analysis program 210 rewrites PjName T370 in which the TemplateID T310, the NodeID T320, the NodeKey T330, the GroupName T350, and the ProjectName T360 of the change management information T300 match, to a value specified by the NodeID and NodeKey of the flow data set indicated by the updated ChangedFlowData T240. Further, the change analysis program 210 sets the ChangedFlag T380 to "true" when there is a change between the TemplateVal T340 and the PjVal T370 in the rewritten value, or sets to "false" when there is no change.

In the above processing, there may be NodeID that is not present in a template flow data set or a copy thereof since a node has been newly registered during flow development. In such a case, processing such as ignoring the NodeID (not setting as a target) may be performed. Conversely, when a node is deleted from the template flow data set or a copy thereof during flow development as well, processing such as ignoring the node (not setting as a target) may be similarly performed.

Further, in generation and change of the change management information T300 of S130 and S140, an action may be taken such as excluding specific information in the node attributes. Example are the node coordinates 560 and the NodeName 540 that is a display name (label) of a node. This is because coordinates and labels are related to display in the visual programming tool, and do not contribute to the processing (function) of an application to be developed.

Using the change management information T300 thus updated, the change analysis program 210 performs a process of calculating a dependency relation between nodes (S150) and ends the processing (S160). Therefore, on the basis of information (that is, the change management information T300) of the flow data set that is of the group and the project and is being developed on the basis of the template flow data set, the change analysis program 210 calculates a possibility (conditional probability) that, when an attribute of a certain node is changed, an attribute of another node is changed.

As an example, for attribute values A and B of a node specified by NodeID and NodeKey, a probability P (A→B) that the attribute value B is to be changed when the attribute value A is changed is calculated as in Formula 1, and a dependency relation (strength of a dependency relation) can be calculated.

$$P(A \rightarrow B) = \frac{\left(\begin{array}{c}\text{Number of projects in which } ChangedFlag \text{ of } A \\ \text{is "true" and } ChangedFlag \text{ of } B \text{ is "true"}\end{array}\right)}{(\text{Number of projects in which } ChangedFlag \text{ of } A \text{ is "true"})} \quad \text{[Formula 1]}$$

For example, in FIG. 6 showing an example of the change management information T300, when an attribute value of key1 of node1 is changed, the change analysis program 210 calculates the probability P (key1→key2) that key2 of node1 is to be changed correspondingly. The denominator of Formula 1 is "1" because there is one group/project, which is GRP1/PJ1, whose ChangedFlag T380 is "true". Whereas, the numerator of Formula 1 becomes "0", because there is no group/project in which ChangedFlag T380 of key1 is "true" and ChangedFlag T380 of key2 is "true" (for key2, GRP1/PJ1 is not targeted because the ChangedFlag T380 is "false", and GRP3/PJ4 is not targeted because the ChangedFlag T380 of key2 is "true" but the ChangedFlag T380 of the prerequisite key1 is "false"). Therefore, the change analysis program 210 can calculate such that P (key1→key2)=0/1=0.

As described above, for all combinations of TemplateID T310, NodeID T320, and NodeKey T330, the change analysis program 210 calculates a conditional probability P (A→B) to be calculated, and updates the dependency relation information T400 for each template. For example, in the above example, since P (node1/key1→node1/key2)=0 in template1, the change analysis program 210 is to update (set to 0) a value of a cell corresponding to "node1"/"key1" in the ChangedNode and "node1"/"key2" in the RelatedNode in the dependency relation information T400 corresponding to template1.

In addition to the number of projects in which Changed-Flag T380 is "true", the change analysis program 210 may consider, for Formula 1, a connection relation of flows. That is, the change analysis program 210 may determine whether or not the node A and the node B are directly or indirectly connected (while relaying a plurality of nodes) from connection information 570 of the flow data set 500 and the like, and counts as the number of projects in the numerator or the denominator exclusively when the node A and the node B are connected. This means that the template flow may include a plurality of flows that are not in a connection relation with each other due to a difference in functions or roles (e.g., in a case where there is a first flow in which the node A is directly or indirectly connected to the node B and a second flow in which the node C is directly or indirectly connected to the node D, but there is no connection relation between the first flow and the second flow), so that these flows may be treated as being independent.

Figure 9:
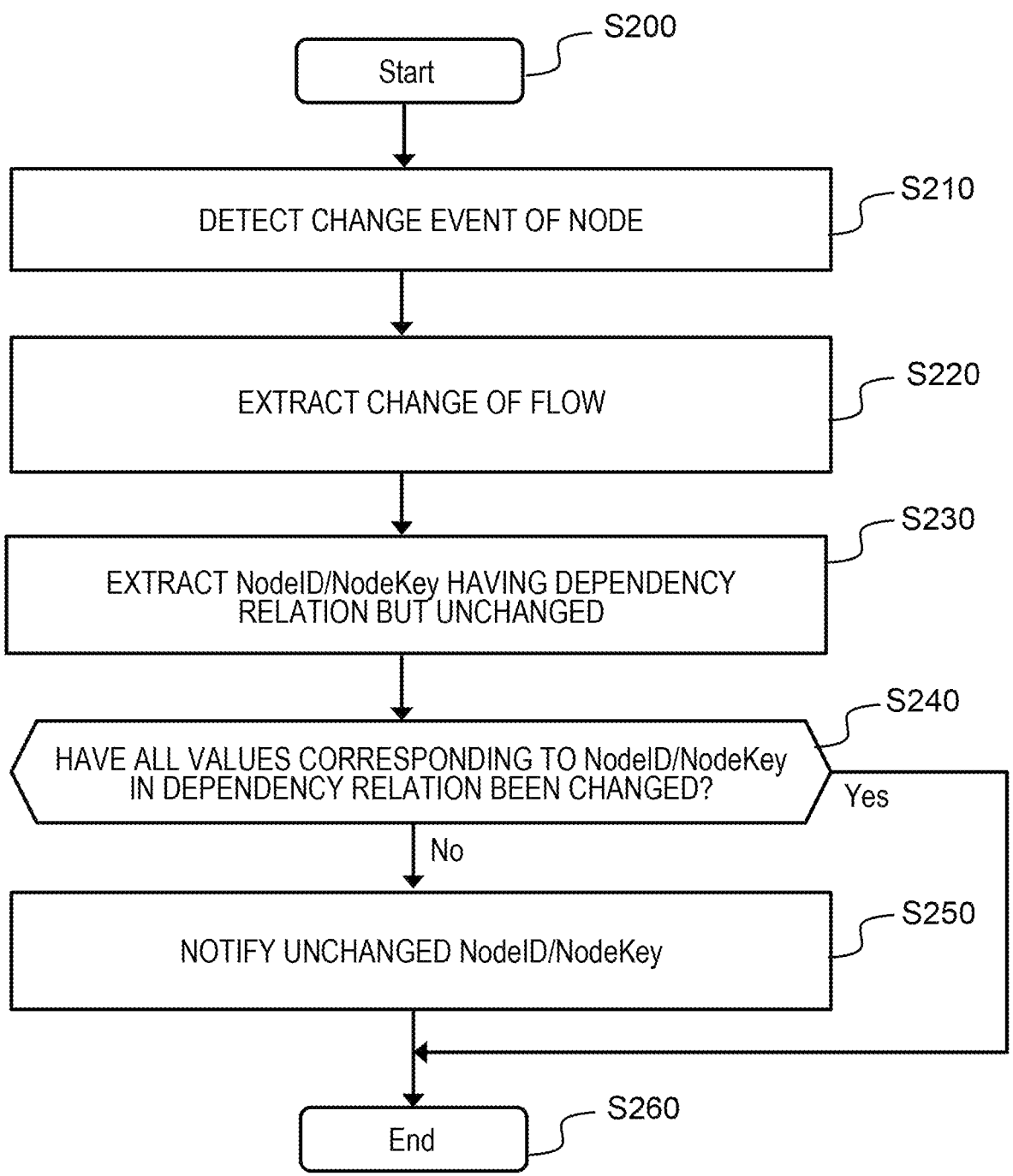
FIG. 9 shows a process to be performed by a change notification program in the first embodiment.

FIG. 9 shows a process to be performed by the change notification program 220.

The change notification program 220 is to perform a process for notifying a developer of other node attributes required to be changed if any, on the basis of the dependency relation information T400, when the developer develops the flow with the visual programming tool 400.

The change notification program 220 starts a process (S200), monitors the visual programming tool 400, and detects a flow change event to the tool 400 by the developer (S210).

The start of this process (S100) may be in a form of starting up at the start of the present system, or may be in an aspect of being activated in response to a flow change event of the visual programming tool 400, as another aspect.

Further, a method of detecting a flow change event may be in an aspect in which the change notification program 220 monitors and detects a change on the visual programming tool 400, or may be in an aspect in which the change notification program 220 is registered as an event notification destination in the visual programming tool 400 as in the case of Webhook described above, and the visual programming tool 400 detects (notifies) the change to the program 220. Alternatively, as an alternative to detection of a change event from the visual programming tool 400, flow data registration to the project management information T200 of the repository management server 300 may be adopted.

The change notification program 220 acquires the flow data set 500 being edited by the developer of the visual programming tool 400, TemplateID of a template flow data set that is a base of the flow data set 500, and a template flow data set corresponding to the TemplateID, and extracts a change in editing from the template flow data set to the flow data set 500 (S220). The TemplateID is acquired from the project management information T200, and the template flow data set is acquired from the template management information T100. In addition, "change" here is an example of a difference between the flow data set and the template flow data set. Specifically, "change" means that NodeID and NodeKey included in the acquired flow data set 500 and the template flow data set are the same, and values of attributes (attribute values) specified by the NodeID/NodeKey are different from each other. At this time, the change notification program 220 may acquire the flow data set 500 by directly calling an I/F (application programming interface (API)) of the visual programming tool 400, or an aspect may be such that the change event is referred to in a case where the flow data set 500 is included as a constituent element of the change event. Further, instead of the flow data set 500, the change notification program 220 may acquire the corresponding flow data set from the project management information T200.

Next, for a combination of NodeID and NodeKey having the same NodeID and NodeKey but different attribute values between the template flow data and the flow data set 500 being edited (hereinafter called a change target NodeID/NodeKey group), the change notification program 220 extracts NodeID/NodeKey having a dependency relation but unchanged (S230).

More specifically, for example, for each NodeID/NodeKey (hereinafter referred to as C) included in the change target NodeID/NodeKey group, the change notification program 220 refers to the dependency relation information T400 of the corresponding TemplateID, and extracts a combination of NodeID/NodeKey (hereinafter referred to as a change candidate NodeID/NodeKey group) that satisfies Formula 2.

$$P(C \rightarrow \text{NodeID/NodeKey}) \geq \theta \qquad \text{[Formula 2]}$$

That is, the change notification program 220 extracts a combination of NodeID/NodeKey that is often changed in accordance with a change of C (=the conditional probability is equal to or greater than $\theta$). At this time, $\theta$ is a threshold value preliminarily defined, which may be different for each TemplateID or may be common in the whole. As an example, $\theta$ is 0.8 (regarding that there is a high possibility of change if 80% or more has been changed) that is used in Pareto's law. In the example of the dependency relation information T400 shown in FIG. 7, when node1/key1 of template1 is regarded as C, node2/key3 and the like are extracted as NodeID/NodeKey belonging to the change candidate NodeID/NodeKey group.

Then, the change notification program 220 defines NodeID/NodeKey group that has not been changed (hereinafter referred to as an unchanged NodeID/NodeKey group). For example, the unchanged NodeID/NodeKey group is set-theoretically defined as in Formula 3.

(Unchanged NodeID/NodeKey group)=(Change candidate NodeID/NodeKey group)−(Change target NodeID/NodeKey group)    [Formula 3]

That is, the change notification program 220 extracts a group of NodeID/NodeKey whose NodeID/NodeKey is included in the change candidate NodeID/NodeKey group and is not included in the change target NodeID/NodeKey group.

Next, the change notification program 220 determines whether or not all the attribute values (values corresponding to NodeID/NodeKey) among attribute values having a dependency relation have been changed (S240). Specifically, the change notification program 220 determines whether or not the unchanged NodeID/NodeKey group is empty.

When the unchanged NodeID/NodeKey group is empty (that is, all changed) (S240: Yes), the process is ended (proceeds to S260).

Conversely, when the unchanged NodeID/NodeKey group is not empty, that is, when there is unchanged NodeID/NodeKey out of NodeID/NodeKey having a high possibility of being changed in accordance with a certain NodeID/NodeKey (S240: No), the process proceeds to S250.

The change notification program 220 notifies of the combination of NodeID/NodeKey determined to be unchanged in S230, to the developer who is editing the target flow data set 500 that has received the change event in step S210 (S250). Specifically, the change notification program 220 notifies the developer of a list of NodeID/NodeKey included in the unchanged NodeID/NodeKey group.

The notification method includes, as an example, a method of displaying on a user interface (UI) as shown by the visual programming tool 400 in FIG. 1. In this case, by notifying the drawing program 410 of information of the unchanged NodeID/NodeKey group, the change notification program 220 can display the status "To Change" (F424 and F425) and the like meaning an unchanged node on the second pane F420, in addition to perform, on the third pane F430, emphasis display of the attribute value F432 of NodeID/NodeKey included in the unchanged NodeID/NodeKey group.

In addition, there is a case where multiple developers belonging to a group identified by the GroupName T210 or a project identified by the ProjectName T220 individually edit one flow data set by using different visual programming tools (that is, one flow data set may be edited by a plurality of visual programming tools). In such a case, an aspect may be adopted in which a relationship between each flow and a visual programming tool that is editing the flow (e.g., an identifier and a notification destination of the visual programming tool) is managed by the repository management server 300 (or another server 100 or 200), and a change is notified to the plurality of visual programming tools editing the same flow data set, on the basis of this information.

Alternatively, another aspect may be of displaying a list of NodeID/NodeKey that is to be changed but is unchanged at the current time, on the visual programming tool or another UI. Alternatively, in a development environment provided with a communication tool such as e-mail or chat, an aspect may be adopted in which the list described above is notified using such another communication tool.

As described above, the display timing depends on the detection of the change event (S210). That is, in a case where the change event of the flow can be detected for each flow change, it is possible to notify of an unchanged node (a node whose node attribute is recommended to be changed) every change of the node. In addition, in a case where the visual programming tool 400 has a button for instruction of registration to the repository management server 300 or for execution to the flow execution program 420, and the change event can be detected in response to depression of the button, it is possible to notify of the unchanged node at the timing of depression.

Second Embodiment

A second embodiment will be described. At that time, differences from the first embodiment will mainly be described, and description of common points with the first embodiment will be omitted or simplified.

In the first embodiment, a method has been shown in which an attribute value of a node that can be concurrently changed is presented to the developer, on an assumption that the node itself is not changed from the template flow, that is, node entity elements (a plurality of node-related elements defining the node entity) such as NodeID, NodeType, and Category of the node are not changed. However, depending on a purpose, it may be desired to change the node entity, that is, at least one of NodeID, NodeType, or Category is to be changed. For example, there is a case of changing, for a node for input of data, from a node that receives an HTTP request to a node that receives another protocol, or a case of changing, for a node for visualization in a graph, from a node to display as a line graph in a time series to a node of another visualization method (e.g., a gauge display for visualizing data at a certain time point).

In the second embodiment, compatibility between nodes is defined in advance. This enables presentation, to the developer, of an attribute of a node that can be changed concurrently as the entire flow, even if a certain node is replaced by another node (even if the node entity is changed).

In order to realize this, in addition to each piece of information shown in the first embodiment, a change candidate management server 200 in the second embodiment holds node management information T500 and rule management information T600 to be described later, and holds flow correspondence information T700 instead of the change management information T300. In addition, a change analysis program 210 performs a process of FIG. 14 instead of the process of FIG. 8, and a change notification program 220 performs a process of FIG. 15 instead of the process of FIG. 9.

FIG. 10 shows an example of the node management information T500.

The node management information T500 has information on nodes. Further, for example, on the basis of the information T500, a node list is displayed on a first pane F410 of a screen of a visual programming tool 400. The information T500 has an entry for each node. Each entry stores NodeType T510 (corresponding to the NodeType 520 shown in FIG. 3), Category T520 (corresponding to the Category 530 shown in FIG. 3), NodeKey T530 (a label for identifying an attribute value corresponding to key1, key2, and the like in the Property 550 shown in FIG. 3), and tag T540 representing features of these combinations. The tag T540 is meta information given in advance in consideration of meaning and usage of nodes and attribute values of the nodes. An example of the tag includes that a value as an attribute value specified by NodeKey is "text", "identifier on the network (IP or host name)", and the like (corresponding to that tag 4 is "text" and tag 2 is "network identifier" in the specific example of tags of FIG. 10).

FIG. 11 shows an example of the rule management information T600.

The rule management information T600 is information that defines a rule on compatibility of nodes or node attributes (specifically, in the second embodiment, a rule indicating which are to be regarded as the same in nodes displayed on the first pane F410 of the screen of the visual programming tool 400 or in node attributes of the nodes).

The rule management information T600 has an entry for each rule. Each entry stores RuleID T610 that is an identifier of a rule, Rules T620 that is a specific rule description, and SelectedFlag T630 that indicates whether or not this rule is to be used.

Examples of the Rules T620 are as follows. That is, according to Rule 0, when NodeID/NodeKey of nodes is the same, attribute values specified by this NodeKey between the template flow and the flow developed by the project are regarded to be the same. According to Rule 1, when a value of NodeKey (same label) of nodes is the same regardless of a type of nodes (NodeType and Category), attribute values specified by this NodeKey are regarded to be the same even if a node included in the template flow is changed to another node (NodeID is different). According to Rule 2, in the node management information T500, attribute values having a same Category of nodes and NodeKey included in the Category are regarded to have a same attribute value specified by this NodeKey, even if the node included in the template flow is changed to another node. According to Rule 3, attribute values specified by a combination of NodeType T510, Category T520, and NodeKey T530 whose tag T540 are all the same are regarded as the same, even if the node included in the template flow data is changed to another node. In addition to this, for example, a rule in which one or more tags are the same may be included.

Among the rules defined in this manner, a rule in which the SelectedFlag T630 is "true" is taken into account in the change analysis program 210 and the change notification program 220 in the second embodiment to be described later. The SelectedFlag T630 is assumed to be preliminarily defined by an administrator or the like providing the entire environment (a rule having SelectedFlag T630 being "true" has been selected). Further, a plurality of rules having SelectedFlag T630 being "true" may be selected. Hereinafter, description will be proceeded as processing under a condition of logical OR (that is, it suffices to fall under any one of the rules) when there are two or more rules having SelectedFlag T630 being "true", but in addition to this, the processing may also be of logical AND (it is necessary to fall under all the rules).

Note that, it can be regarded that an embodiment exclusively applied with Rule 0 corresponds to the first embodiment, among the rules shown in the example of the rule management information T600 shown in FIG. 11.

FIG. 12 shows an example of the flow correspondence information T700.

The information T700 is information that holds a correspondence of NodeID and NodeKey between a template flow data set and a flow data set (the flow data set 500 or the ChangedFlowData T240) developed by a certain group and project on the basis of the rule selected in the rule management information T600.

More specifically, the information T700 has an entry for each node attribute included in the template flow data set. Each entry stores information T710 (T711, T712, T713, and T714) included in the template flow data set, information T720 (T721, T722, T723, T724, and T725) included in the flow data set developed by the group and the project, and ChangedFlag T730 (of the same type as the ChangedFlag T380 of the change management information) indicating whether or not the attribute value has been changed between these two node attributes. This correspondence between the information T710 and T720 is determined by applying the rule management information T600.

The information T710 includes: TemplateID T711 that is an identifier of the template flow data set; and NodeID T712, NodeKey T713, and a value T714 specified by the NodeID T712 and the NodeKey T713 that are included in the template flow data set. The information T720 includes: GroupName T721 and ProjectName T722 that are identifiers of the group and project that develop; and NodeID T723, NodeKey T724, and a value T725 specified by the NodeID T723 and NodeKey T724 that are included in the flow data set to be developed.

The way of reading this information T700 is, for example, as follows. That is, according to the entry in the first row, for template1, an attribute value X specified by node1/key1 corresponds to an attribute value Y of node4/key41 in the flow data set developed by GRP1/PJ1, and the attribute value Y is a changed value of the attribute value X (the ChangedFlag T730 is "true").

A generation method of this information T700 will be described later.

By using the information shown in FIGS. 10 to 12, nodes displayed on the screen of the visual programming tool 400 or node attributes of the nodes can be grouped on the basis of specific rules, and can be regarded to be the same in a same group, even if at least one of a node entity or a key is changed from the template flow data set. An outline of the processing will be described with reference to FIG. 13. A specific process flow will be described with reference to FIGS. 14 and 15.

Hereinafter, with reference to FIG. 13, an outline of a process of the second embodiment, particularly a process to be performed by the change analysis program 210 will be described.

First, in Step 1, the change analysis program 210 applies the rule selected in the rule management information T600 (while using the node management information T500 as necessary) to the flow data set 500 of the visual programming tool 400 developed by the group/project (or the ChangedFlowData F310 stored in the repository management server 300) and the template flow data set F110 having been a base of the flow data set 500. This causes generation of the flow correspondence information T700 indicating a combination of NodeID/NodeKey of the template flow and NodeID/NodeKey that can be regarded as equivalent to the NodeID/NodeKey of the template flow.

Next, in Step 2, the change analysis program 210 updates the dependency relation information T400 with a format converted into the NodeID/NodeKey included in the template flow, on the basis of the flow correspondence information T700. That is, for example, in the entry of the first row of the information T720 shown in FIG. 12, it is regarded that a change of the attribute value corresponding to node4/key41 included in the flow data set developed by GRP1/PJ1 is the same as a change of the attribute value corresponding to node1/key1 included in template1, that is, these attribute values are corresponding. Therefore, there is considered to be no difference when these attribute values are the same, while there is considered to be a difference when these attribute values are different. On the basis of this result, the dependency relation information T400 is updated.

By thus defining the dependency relation information T400 with the NodeID/NodeKey of the template flow data set, it becomes possible to determine the presence or absence of change of node attribute replacement (that is, compatibility of node attributes) even when there is a change in the node in development.

Figure 15:
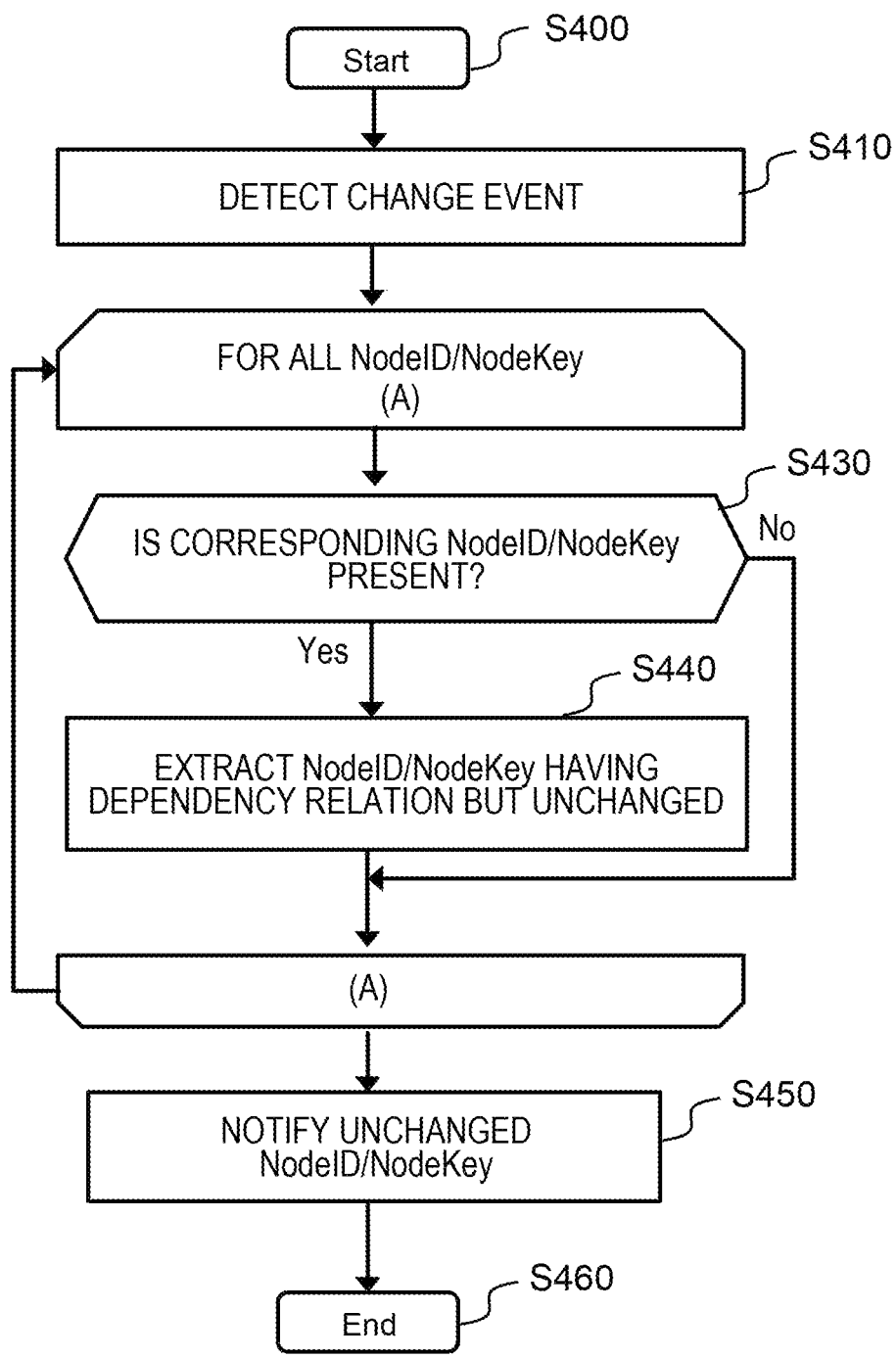
FIG. 15 shows a process to be performed by a change notification program in the second embodiment.

Similarly, also in a process of the change notification program 220 (details are shown in FIG. 15), applying the flow correspondence information T700 to the dependency relation information T400 enables conversion from the NodeID/NodeKey of the template flow data set to the NodeID/NodeKey in the flow data set, and enables notification of an attribute value of an unchanged node to the visual programming tool 400 that edits the flow data set.

Figure 14:
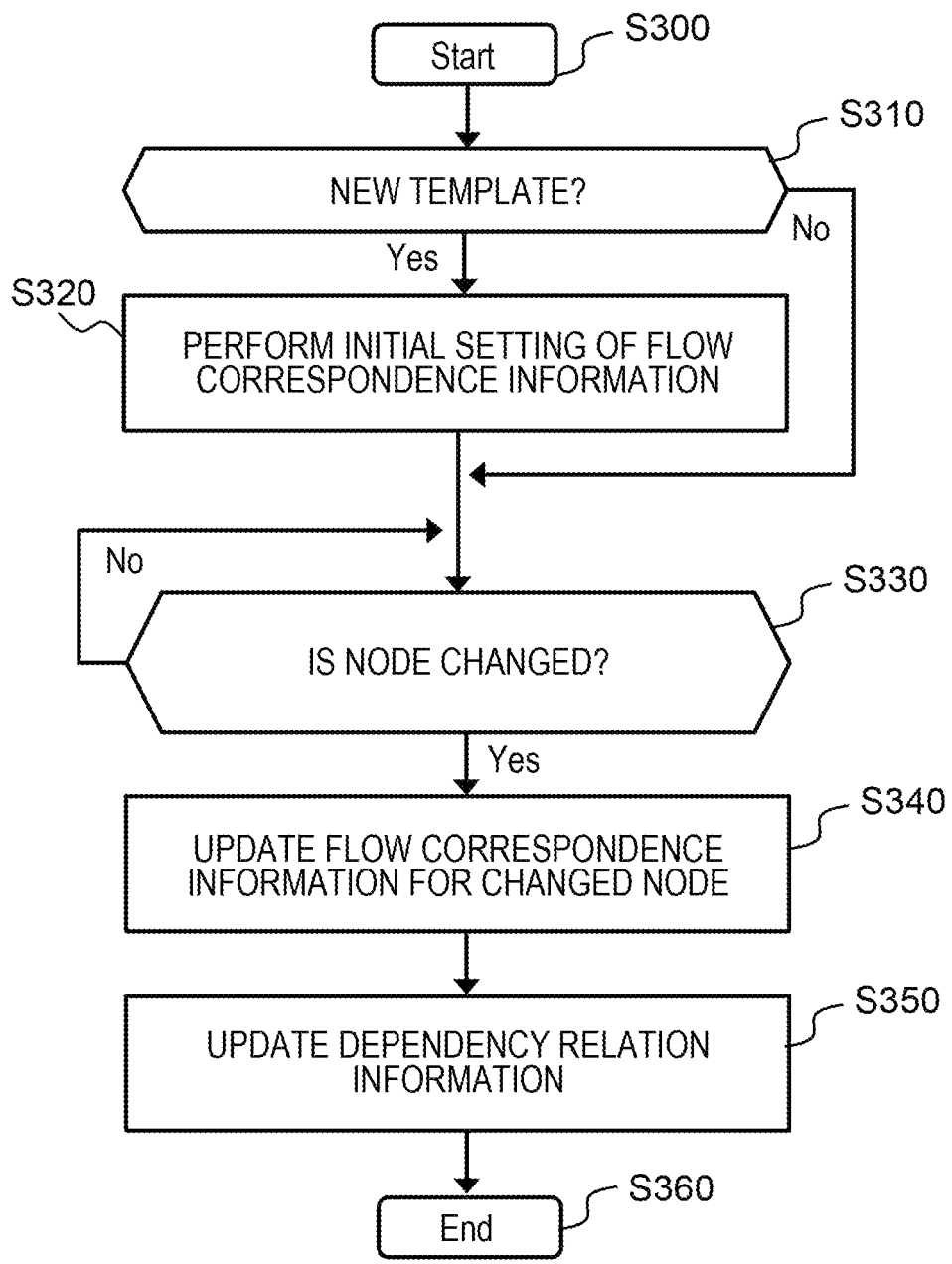
FIG. 14 shows a process to be performed by a change analysis program in the second embodiment.

FIG. 14 shows a process of the change analysis program 210 in the second embodiment.

The change analysis program 210 of the second embodiment starts a process (S100) similar to that in the first embodiment (S300).

Then, the change analysis program 210 monitors each visual programming tool 400. When the change analysis program 210 detects that a template flow data set has been downloaded from the template management server 100 to any one of the visual programming tools 400, the change analysis program 210 determines whether or not the template flow data set is a new template flow data set (S310). This determination method may be such a method that the change analysis program 210 refers to and detects the flow data set 500 of each visual programming tool 400, or may be such a method that the visual programming tool 400 (or the flow management program 430 or the like included therein) notifies the change analysis program 210 as in the WebHook described above.

Next, in a case of acquisition of a new template flow data set (S310: Yes), the change analysis program 210 performs initial setting of the flow correspondence information T700 (S320). The initial setting here is to add, for each node attribute in the new template flow data set, an entry corresponding to the node attribute to the flow correspondence information T700. In each added entry, the ChangedFlag T730 is "false". For example, consider a case where the visual programming tool used by GRP a/PJ b downloads a template n, and the template n includes a node m, a key l, and a Val v. At this time, the flow correspondence information T700 is inserted with such an entry (row) in which the TemplateID T711 is "template n", the NodeID T712 and T723 are "node m", the NodeKey T713 and T724 are "key l", the Val T714 and T725 are "Val v", the GroupName T721 is "GRP a", the ProjectName T722 is "PJ b", and the ChangedFlag T730 is "false".

Next, the change analysis program 210 determines whether or not a node entity or a node attribute included in a flow data set on the visual programming tool 400 has been changed (S330). When there is no change, the process stands by as it is (waits for occurrence of S310 or S330). When a change has occurred (S330: Yes), the process proceeds to S340.

Figure 13:
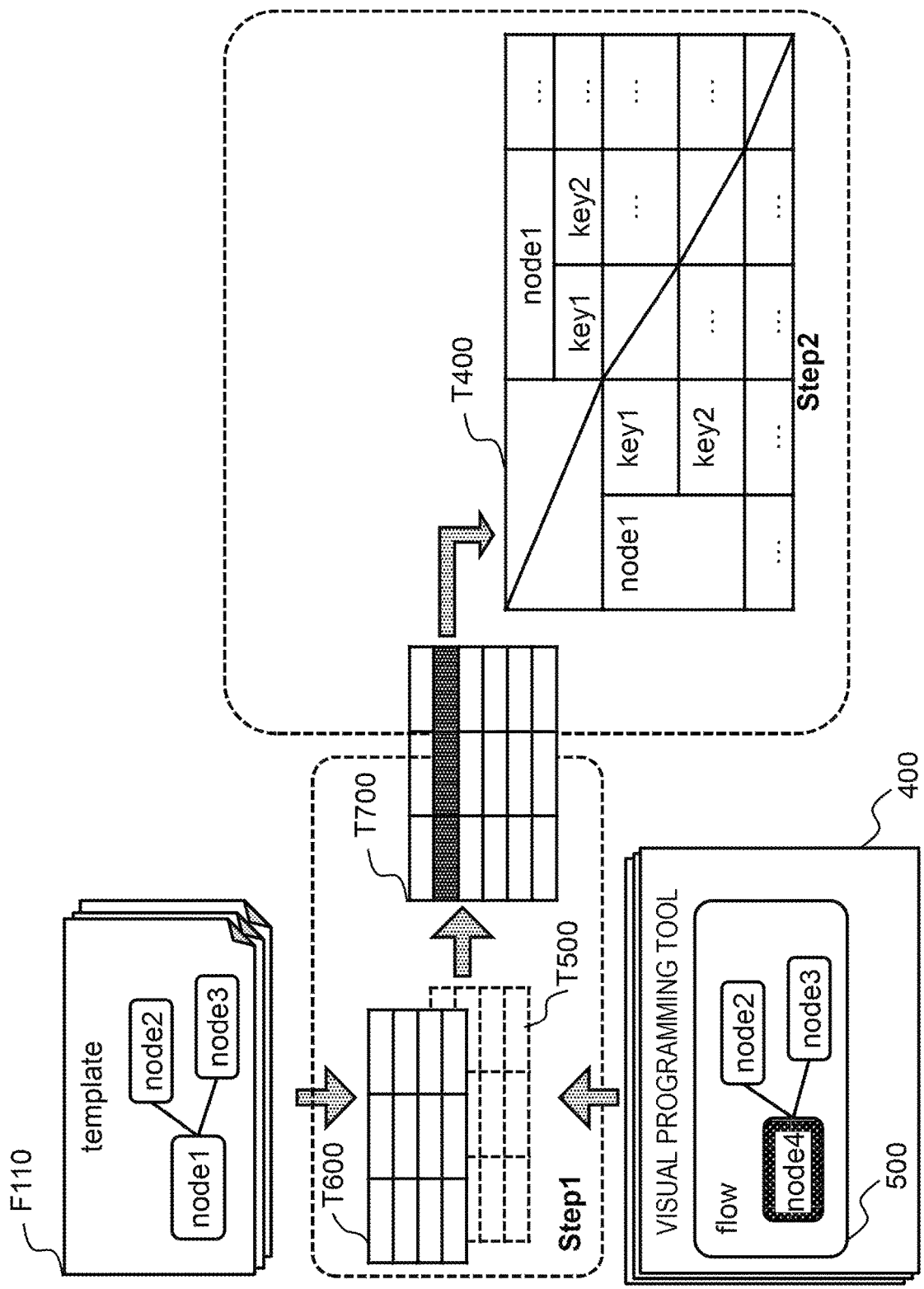
FIG. 13 is a schematic diagram showing an outline of the second embodiment.

In S340 (corresponding to Step 1 in FIG. 13), the change analysis program 210 updates the flow correspondence information T700 for the node determined to have changed in S330, on the basis of the selected rule of the rule management information T600 (additionally, the node management information T500 as necessary) (corresponding to Step 1 in the conceptual diagram of FIG. 13).

Hereinafter, description will be specifically made on the assumption that, in the change determination of S330, a flow to be developed (hereinafter referred to as a developed flow) using a visual programming tool by "GRP a/PJ b" is derived from a template n that is a base, and it has been determined, in S330, that a node A included in a template flow of the template n has been changed to a node B on the developed flow. For convenience, the node A described above will be called a pre-change node, and the node B will be called a post-change node.

In one example of S340, it is assumed that Rule 0 is selected as a rule among the rules shown in the example of FIG. 11. Further, it is assumed that NodeID/NodeKey is the same in the pre-change node and the post-change node. In this case, the change analysis program 210 updates Val T725 with an attribute value specified by the NodeID/NodeKey of the post-change node. Then, when the Val T714 and T725 are different, the change analysis program 210 sets the ChangedFlag T730 to "true".

Conversely, it is assumed that the NodeID is different between the pre-change node and the post-change node. In this case, the change analysis program 210 adds emptiness (e.g., "None" or "Null") meaning that such a node is not present (see entry in the second row from the bottom of the flow correspondence information T700 in FIG. 12) into the NodeID T723 or NodeKey T724. When no other rule is selected, the change analysis program 210 ends the process, whereas when other rule is selected, the change analysis program 210 performs update according to the rule.

In addition, in a case where Rule 1 is selected, when NodeKey is the same (e.g., in the node management information T500 of FIG. 10, the NodeKey T530 "text" is the same in the nodes with NodeType of "inject" and "debug") even if NodeID is different between the pre-change node and the post-change node, the change analysis program 210 changes the NodeID T723 to the NodeID of the post-change node, and changes the Val T725 to the attribute value specified by NodeID/NodeKey of the post-change node, in the entry specified by the NodeID/NodeKey of the pre-change node (that is, the template flow) and by the GRP a/PJ b (the entry (row) of the flow correspondence information T700). Thereafter, the change analysis program 210 updates the ChangedFlag T730 in the entry. As for an entry in which NodeKey that does not match between the pre-change node and the post-change node, similarly to Rule 0, the change analysis program 210 adds emptiness into NodeID T723, NodeKey T724, and Val T725.

In addition, for example, in a case where Rule 2 is selected, the change analysis program 210 refers to the node management information T500, in addition to Rule 1. When the Category T7520 matches, the change analysis program 210 updates the Val T725, or otherwise adds emptiness. For example, in the example of FIG. 10, NodeType "http" and "mqtt" both have Category "input", and NodeKey "address" can be regarded as the same. Whereas, the NodeType "inject" and "debug" have the same NodeKey "text", but the Category is different. Therefore, the NodeType "inject" and "debug" are not to be regarded as the same.

In addition, in a case where Rule 3 is selected, for example, the change analysis program 210 regards the ones as the same in which all the Tag T540 of the node management information T500 match, instead of matching of the Category and matching of the NodeKey. Normally, as long as the tag is correctly set, it is considered that there will be no more than one NodeKey having all the tags matching in one node. If there is more than one NodeKey having all the tags matching, the change analysis program 210 may take an action such as regarding them all as the same, or further selecting one having the closest NodeKey or attribute value.

As described above, the change analysis program 210 updates the flow correspondence information T700.

In S350 (corresponding to Step 2 in FIG. 13), the change analysis program 210 updates the dependency relation information T400 from the flow correspondence information T700 thus updated. The calculation method may be the same as in Formula 1 of the first embodiment. That is, a conditional probability is calculated using NodeID/NodeKey included in the template flow data set. Specifically, the change analysis program 210 is to calculate information T711 instead of the information T310, information T712 instead of the information T320, information T713 instead of the information T330, information T721 instead of the information T350, information T722 instead of the information T360, and information T730 instead of the information T380. Further, in a case where there is an entry having no ChangedFlow T720 corresponding to TemplateFlow T710 (there is an entity having "None" or "Null" indicating emptiness in information T723 and T724) in the flow correspondence information T700, the change analysis program 210 may perform processing such as excluding the number related to the entry from a parameter of calculation of the conditional probability. Even if NodeID is changed in individual groups and projects, it is possible to handle nodes and attributes of the nodes that are easily changed in association with the change, by using NodeID/NodeKey included in the template flow data set in this manner.

In the above description, an example has been shown in which the change analysis program 210 creates and updates the flow correspondence information T700 and the dependency relation information T400 by using the flow data set 500 of the visual programming tool 400. In addition to this, the ChangedFlowData T240 (data set F310 on FIG. 1) included in the repository management server 300 may be used instead of the flow data set 500 of the visual programming tool 400. In this case, the detection (determination) of a node change in S330 may be carried out on the basis of a change history (operation history) of the node on the visual programming tool and a registration history (also called a change history or a commit history) of the ChangedFlowData of the repository management server. Alternatively, a changed node may be determined from a connection relation of nodes included in the ChangedFlowData (e.g., as indicated by the template flow data set F110 in FIG. 13, in a case where the template in which node1 is connected to node2 and node3 becomes flow data in which node4 is connected to node2 and node3 in the ChangedFlowData, it can be regarded that node1 has been changed to node4).

FIG. 15 shows a process of the change notification program 220 in the second embodiment.

The change notification program 220 of the second embodiment starts a process (S200) similar to that in the first embodiment (S400), and also detects a node change event similarly to the process S210 of the first embodiment (S410).

Next, the change notification program 220 performs a process of S430 and S440, for each NodeID/NodeKey (hereinafter referred to as target flow NodeID/NodeKey) included in the flow data set being developed by the visual programming tool 400 (or flow data set registered in the repository management server) (loop (A)). Hereinafter, one target flow NodeID/NodeKey is taken as an example.

First, in step S430, the change notification program 220 determines whether the target flow NodeID/NodeKey is present in the flow correspondence information T700, as well as whether the corresponding NodeID/NodeKey of the template flow data set (hereinafter referred to as corresponding template NodeID/NodeKey) is present. That is, in a case where the target flow NodeID/NodeKey is present in the ChangedFlow T720 of the flow correspondence information T700, and the NodeID/NodeKey that is of the TemplateFlow T710 and corresponds to the target flow NodeID/NodeKey is present (value is not empty or None), the corresponding template NodeID/NodeKey is determined to be present. For example, in the example of FIG. 12, when the node4/key41 of GRP1/PJ1 is the target flow NodeID/NodeKey (see the entry of the first row in FIG. 12), it is determined that the corresponding template NodeID/NodeKey is present and is node1/key1 of template1. Conversely, when there is no corresponding template NodeID/NodeKey specified in this way (Null or None indicating emptiness is contained), it is determined that the corresponding template NodeID/NodeKey is not present.

Then, when the corresponding template NodeID/NodeKey is not present (S430: No), the process proceeds to S430 for the next target flow NodeID/NodeKey. When such corresponding template NodeID/NodeKey is present (S430: Yes), the process proceeds to S440.

Next, in step S440, for a combination of the corresponding template NodeID/NodeKey, the change notification program 220 extracts such a combination of the NodeID/NodeKey (hereinafter referred to as a change candidate template NodeID/NodeKey group) that the dependency relation of the dependency relation information T400 is equal to or larger than a threshold value (the idea of this process is the same as that in the process shown in S230 and Formula 2). That is, in the example of FIG. 7, when the corresponding template NodeID/NodeKey is node1/key1 and the threshold value is 0.8, node2/key3 and the like are to be included in the change candidate template NodeID/NodeKey group.

For a combination of the NodeID/NodeKey included in such change candidate template NodeID/NodeKey group, the change notification program 220 performs a process opposite to S430 by using the flow correspondence information T700, and determines whether or not a node and an attribute of the node (change candidate flow NodeID/NodeKey) in a flow of the current target group and project have been changed.

For example, consider an example in which, in the flow correspondence information T700 in FIG. 12, the group/project to be determined this time is GRP1/PJ1, and the change candidate template NodeID/NodeKey is node2/key3 included in the above-described template1. At this time, by using the flow correspondence information T700 of FIG. 12, it can be specified that the change candidate flow NodeID/NodeKey of the current target GRP1/PJ1 corresponds to node5/key6 (see the entry of the third row in FIG. 12). Thereafter, it is determined as changed when ChangedFlag T730 of the same row is "true", and determined as unchanged when ChangedFlag T730 is "false". If the row is not present (that is, NodeID T723 or NodeKey T724 is empty (Null)), the change notification program 220 may regard, for example, as out of target (not to be notified), or may issue such a special notice that nodes or attributes having a dependency relation have not been set, or the like.

Among combinations of change candidate flow NodeID/NodeKey calculated in this manner, a collection of combinations determined as unchanged is to be called an unchanged flow NodeID/NodeKey group.

Finally, in S450, the change notification program 220 notifies the developer of NodeID/NodeKey included in the unchanged flow NodeID/NodeKey group created up to S440, and ends the process (S460). As the notification method, similarly to the first embodiment, a list may be notified or the like to the developer by another method, in addition to displaying on the visual programming tool 400.

Third Embodiment

A third embodiment will be described. At that time, differences from the first and second embodiments will mainly be described, and description of common points with the first and second embodiments will be omitted or simplified.

In the embodiments above, an example has been mainly adopted in which there is one template flow data set that is a premise of a flow to be developed. In practice, however, there may be a use case in which a plurality of template flow data sets are combined to develop one flow. The third embodiment is an embodiment to enable this.

As an example of a management method of one flow data set prepared on the basis of a plurality of template flow data sets in this way, a project management information T200 may have a configuration as shown in FIG. 16. In other words, it is possible to manage as a flow data set (hereinafter referred to as a sub-flow data set) divided in accordance with which template flow data set has derived a flow data set 500 of a visual programming tool 400. For example, in FIG. 16, a flow data set corresponding to GRP1/PJ1 is managed as being formed by flow111.json, which is a sub-flow data set derived from template1, and flow113.json, which is a sub-flow data set derived from template3. Managing in this way enables application of the method described in the first embodiment or the second embodiment. Meanwhile, a node that is not included in the template flow data set and newly added by a developer may be included in a sub-flow data set constituting a flow data set of the group and the project. For example, in the above example, such a newly added node may be included in the sub-flow data set of either flow111.json or flow113.json.

Further, as a method other than this, it can be realized in such an aspect that one flow data set has information of a template flow data set that has derived. An example is a method in which each node has TemplateID as an attribute value thereof. For example, in the example of the structure of the flow data set shown in FIG. 3, it is possible to employ such as having TemplateID at a same position as NodeID.

Fourth Embodiment

A fourth embodiment will be described. At that time, differences from the first to third embodiments will mainly be described, and description of common points with the first to third embodiments will be omitted or simplified.

In the above embodiments, the dependency relation is calculated without considering a change order of the node attribute. However, in development of the flow data set by a visual programming tool 400, it may be desirable to consider a thought process of a developer, that is, to consider a change order of a node attribute in calculation of a dependency relation.

In order to realize this, for example, the visual programming tool 400, or a change analysis program 210 in a change candidate management server 200 that monitors the visual programming tool 400 holds a change order of a node attribute (e.g., an order of changed NodeID/NodeKey), together with a flow data set. Then, each entry of change management information T300 generated from a flow data set being developed stores, instead of ChangedFlag T380, an order in which a node attribute corresponding to the entry has been changed (e.g., "1" when changed first, "2" next, "NULL" if not changed, and the like), as shown in FIG. 17. A sequence of the change order corresponding to each node attribute is the change order of the node attribute. Then, instead of Formula 1, Formula 4 is adopted as a formula for calculating a probability P (A→B) that an attribute value B is to be changed when an attribute value A is changed.

units of certain development breaks, or the repository management server 300 holds its registration history (also called a commit history and the like). However, the dependency relation may be calculated using the registration history as the change order of the node attribute, by regarding this registration history as the change order of the node attribute.

The above description can be summarized as follows, for example. Note that the following summary may include items not described above.

The change candidate management server 200 (an example of a flow preparation assisting apparatus) includes a change analysis unit (an example of a dependency relation calculation unit) and a change notification unit (an example of a dependency relation notification unit). The change analysis unit is a function realized by the change analysis program 210 being executed by the processor unit 33. The change notification unit is a function realized by the change notification program 220 being executed by the processor unit 33.

The change analysis unit: calculates a difference between one or more flow data sets among one or a plurality of flow data sets generated by one or a plurality of visual programming tools, and a target template flow data set that is a template flow data set having been a base of the one or more flow data sets among one or a plurality of template flow data sets; and calculates a dependency relation between attribute values for a template flow indicated by the target template flow data set, from the calculated difference. "Difference" may be a difference of at least one of a node entity or a node attribute (e.g., a set of a key and an attribute value). Further, a change may be calculated as a difference each time the node attribute is changed on the visual programming tool. Alternatively, one or more of stored flow data sets after editing may be read out, and a difference between the read flow data set and the template flow data set having been a base of the flow data set may be calculated. In addition, "calculating dependency relation" may be calculation of strength of the dependency relation. Typically, two attribute values are included in "between attribute values", but three or more attribute values may be included.

The change notification unit issues a notification of information on the calculated dependency relation. For example, "notification" may include information indicating strength of a dependency relation between a focused attribute value $$P(A \to B) = \frac{\left(\begin{array}{c}\text{Number of projects that satisfy (change order of } B) > \\ \text{(change order of } A)\end{array}\right)}{(\text{Number of projects in which change order of } A \text{ is not ``NULL''})} \quad \text{[Formula 4]}$$

Updating dependency relation information T400 with the probability thus calculated enables calculation of the dependency relation in consideration of the change order of the node attribute. For these reasons, the dependency relation information T400 is asymmetric, that is, P (A→B) and P (B→A) are different from each other in the table (the dependency relation information T400 is symmetric in the first embodiment, that is, P (A→B) and P (B→A) are the same in the table).

Alternatively, instead of the change order of the node attribute in the visual programming tool, a registration history of a flow data set to a repository management server 300 may be adopted. Generally, in development using the repository management server 300, source code is registered (committed) to the repository management server 300 in (e.g., a changed attribute value) and at least one attribute value other than the focused attribute value, or may include information indicating a node attribute including an attribute value in which strength of a dependency relation with the focused attribute value is equal to or more than a certain value.

This makes it possible to calculate a dependency relation between attribute values for a template flow without requiring preliminary definition of a constraint condition for each template data set, and to issue a notification of information on the dependency relation. In addition, when there are multiple developers who develop applications with visual programming tools, the developers can utilize knowledge of other developers since the dependency relation is calculated from a difference with one or more flow data sets prepared by multiple developers.

One or a plurality of template flow data sets are managed by the template management server 100 that is a first server storing the one or a plurality of template flow data sets. A relationship (e.g. project management information T200) between one or a plurality of template flow data sets and one or a plurality of flow data sets is managed by the repository management server 300 that is a second server storing one or a plurality of flow data sets. Thus, the functions of the template management server 100 and the repository management server 300 can be effectively used.

A dependency relation between attribute values is calculated at a time of completion of changing one or more attribute values of one or more nodes in the template flow indicated by a copy of the target template flow data set, and a notification is issued to the visual programming tool displaying information on a flow data set completed of the change of the one or more attribute values. This allows the developer to know, during editing of the flow, whether or not it is necessary to change other attribute values at a time of completion of changing the attribute value.

Calculating a dependency relation between attribute values is, for each attribute value, to calculate a conditional probability that is a probability that, when certain one or more attribute values out of two or more attribute values in the attribute values are changed, another one or more attribute values of the two or more attribute values are to be changed. The notification is a notification of information on one or more attribute values whose conditional probability between with one or more attribute values changed with respect to the template flow indicated by a copy of the target template flow data set exceeds a certain value that has been preliminary defined. This allows the developer to know an attribute value having a strong dependency relation with the changed attribute value (an attribute value presumed to require a change in association with a change in a certain attribute value).

Editing of a copy of the target template flow data set may include, instead of or in addition to changing an attribute value of at least one node in the template flow indicated by the target template flow data set, changing at least one of a key corresponding to the attribute value of the at least one node or a node entity of the at least one node. In calculation of a difference between flow data sets, even if a part of a node-related element among a plurality of node-related elements such as a key and a node ID, or a node type and a node category is different, attribute values in which the part of the node-related element is different are regarded as mutually corresponding attribute values between one or more flow data sets and the target template flow data set, (there is no difference when the attribute values are the same, and there is a difference when the attribute values are different) as long as the remaining node-related elements among the plurality of node-related elements conform to one or more preliminary defined rules. This makes it possible to expect improvement of the accuracy of the calculated difference, and consequently to expect improvement of the accuracy of the calculated dependency relation.

Note that one or more tags may be associated with at least one key. In calculation of a difference between flow data sets, even if at least a part of a node-related element among the plurality of node-related elements is different, attribute values in which the at least a part of the node-related element is different are regarded as mutually corresponding attribute values between one or more flow data sets and the target template flow data set, as long as one or more associated tags conform to one or more preliminary defined rules. This makes it possible to expect improvement of the accuracy of the calculated difference, and consequently to expect improvement of the accuracy of the calculated dependency relation.

Issuing a notification according to the calculated dependency relation is to issue a notification of information on the calculated dependency relation, to the visual programming tool displaying information on a flow including a node related to the calculated dependency relation, in order to display the calculated dependency relation by the visual programming tool. This allows the developer to know the dependency relation between the attribute values via the visual programming tool, since contents of the notification are displayed on the screen of the visual programming tool.

The change analysis unit calculates the dependency relation between the attribute values on the basis of the change order of the attribute value for the template flow indicated by the target template flow data set, in addition to the above calculated difference for the target template flow data set. This makes it possible to expect improvement of the accuracy of the calculated dependency relation.

Several embodiments have been described above, but these embodiments are examples for explaining the present invention, and are not intended to limit the scope of the present invention to the embodiments only. The present invention can be implemented in various other aspects. For example, the present invention can be used at least in application development using IT systems based on information and communication technology, in particular visual programming tools.

What is claimed is:

1. A non-transitory computer-readable storage medium storing thereon a computer program for causing a computer to execute:
   calculating a difference between one or more flow data sets among one or a plurality of flow data sets generated by one or a plurality of visual programming tools, and a target template flow data set that is a template flow data set having been a base of the one or more flow data sets among one or a plurality of template flow data sets, wherein
   each of the one or a plurality of template flow data sets is a data set indicating a template flow represented by a plurality of nodes and a connection between individual nodes in the plurality of nodes,
   each of the one or a plurality of flow data sets is a data set indicating a flow represented by a plurality of nodes and a connection between individual nodes in the plurality of nodes, the data set being after editing of a copy of any template flow data set,
   each node is associated with one or a plurality of node attributes constituting a property of the node, and
   each node attribute is defined by a key and an attribute value;
   calculating a dependency relation between attribute values for a template flow indicated by the target template flow data set, from the calculated difference; and
   issuing a notification of information on the calculated dependency relation.

2. The non-transitory computer-readable storage medium according to claim 1, wherein
   the one or a plurality of template flow data sets are managed by a template management server that is a first server storing the one or a plurality of template flow data sets, and a relationship between the one or a plurality of template flow data sets and the one or a plurality of flow data sets is managed by a repository management server that is a second server storing the one or a plurality of flow data sets.

3. The non-transitory computer-readable storage medium according to claim 1, wherein
a dependency relation between attribute values is calculated at a time of completion of changing one or more attribute values of one or more nodes in a template flow indicated by a copy of the target template flow data set, and
the notification is issued to a visual programming tool displaying information on a flow data set completed of changing the one or more attribute values.

4. The non-transitory computer-readable storage medium according to claim 1, wherein
calculating a dependency relation between attribute values is, for each attribute value, to calculate a conditional probability that is a probability that, when certain one or more attribute values out of two or more attribute values in the attribute values are changed, another one or more attribute values out of the two or more attribute values are to be changed, and
the notification is a notification of information on one or more attribute values whose conditional probability between one or more attribute values changed with respect to a template flow indicated by a copy of the target template flow data set exceeds a certain value that is preliminary defined.

5. The non-transitory computer-readable storage medium according to claim 1, wherein
editing of a copy of the target template flow data set sometimes includes, instead of or in addition to changing an attribute value of at least one node in a template flow indicated by the target template flow data set, changing at least one of a key corresponding to an attribute value of the at least one node or a node entity of the at least one node, and
in calculation of a difference between the one or more flow data sets and the target template flow data set, even when a part of a node-related element among a plurality of node-related elements such as a key and a node ID, or a node type and a node category is different, attribute values in which the part of the node-related element is different are regarded as mutually corresponding attribute values between the one or more flow data sets and the target template flow data set, as long as a remaining node-related element among the plurality of node-related elements conforms to one or more rules that are preliminary defined.

6. The non-transitory computer-readable storage medium according to claim 5, wherein
one or more tags are associated with at least one key, and
in calculation of a difference between the one or more flow data sets and the target template flow data set, even when at least the part of the node-related element among the plurality of node-related elements is different, attribute values in which the at least the part of the node-related element is different are regarded as mutually corresponding attribute values between the one or more flow data sets and the target template flow data set, as long as one or more associated tags conform to one or more rules that are preliminary defined.

7. The non-transitory computer-readable storage medium according to claim 1, wherein issuing a notification according to the calculated dependency relation is to issue a notification of information on the calculated dependency relation, to a visual programming tool displaying information on a flow including a node related to the calculated dependency relation, in order to display the calculated dependency relation by the visual programming tool.

8. The non-transitory computer-readable storage medium according to claim 1, wherein
a dependency relation between attribute values is calculated based on a change order of an attribute value for a template flow indicated by the target template flow data set, in addition to the calculated difference for the target template flow data set.

9. A flow preparation assisting apparatus comprising:
a dependency relation calculation unit configured to calculate a difference between one or more flow data sets among one or a plurality of flow data sets generated by one or a plurality of visual programming tools, and a target template flow data set that is a template flow data set having been a base of the one or more flow data sets among one or a plurality of template flow data sets, and calculate a dependency relation between attribute values for a template flow indicated by the target template flow data set, from the calculated difference; and
a dependency relation notification unit configured to issue a notification of information on the calculated dependency relation, wherein
each of the one or a plurality of template flow data sets is a data set indicating a template flow represented by a plurality of nodes and a connection between individual nodes in the plurality of nodes,
each of the one or a plurality of flow data sets is a data set indicating a flow represented by a plurality of nodes and a connection between individual nodes in the plurality of nodes, the data set being after editing of a copy of any template flow data set,
each node is associated with one or a plurality of node attributes constituting a property of the node, and
each node attribute is defined by a key and an attribute value.

10. A flow preparation assisting method comprising:
calculating a difference between one or more flow data sets among one or a plurality of flow data sets generated by one or a plurality of visual programming tools, and a target template flow data set that is a template flow data set having been a base of the one or more flow data sets among one or a plurality of template flow data sets, wherein
each of the one or a plurality of template flow data sets is a data set indicating a template flow represented by a plurality of nodes and a connection between individual nodes in the plurality of nodes,
each of the one or a plurality of flow data sets is a data set indicating a flow represented by a plurality of nodes and a connection between individual nodes in the plurality of nodes, the data set being after editing of a copy of any template flow data set,
each node is associated with one or a plurality of node attributes constituting a property of the node, and
each node attribute is defined by a key and an attribute value;
calculating a dependency relation between attribute values for a template flow indicated by the target template flow data set, from the calculated difference; and issuing a notification of information on the calculated dependency relation.

* * * * *